US010626989B2

(12) United States Patent
Tsuchida et al.

(10) Patent No.: US 10,626,989 B2
(45) Date of Patent: Apr. 21, 2020

(54) HYDRAULIC CONTROL DEVICE FOR AUTOMATIC TRANSMISSION

(71) Applicants: AISIN AW CO., LTD., Anjo-shi, Aichi-ken (JP); TOYOTA JIDOSHA KABUSHIKI KAISHA, Toyota-shi, Aichi-ken (JP)

(72) Inventors: Kenichi Tsuchida, Nishio (JP); Toshiaki Hayashi, Toyohashi (JP); Masafumi Takasu, Okazaki (JP); Yuta Seriguchi, Anjo (JP); Masashi Takizawa, Anjo (JP); Syuji Moriyama, Nagakute (JP); Takafumi Inagaki, Toyota (JP); Yoshinobu Soga, Toyota (JP); Yoshihiro Mizuno, Nagoya (JP); Hiromitsu Nitani, Okazaki (JP)

(73) Assignees: AISIN AW CO., LTD., Anjo (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 386 days.

(21) Appl. No.: 15/322,028

(22) PCT Filed: Jul. 14, 2015

(86) PCT No.: PCT/JP2015/070090
§ 371 (c)(1),
(2) Date: Dec. 23, 2016

(87) PCT Pub. No.: WO2016/013441
PCT Pub. Date: Jan. 28, 2016

(65) Prior Publication Data
US 2017/0146121 A1    May 25, 2017

(30) Foreign Application Priority Data

Jul. 23, 2014 (JP) ................................. 2014-150022

(51) Int. Cl.
*F16H 61/70*    (2006.01)
*F16H 37/02*    (2006.01)
(Continued)

(52) U.S. Cl.
CPC ........... *F16H 61/702* (2013.01); *F16H 37/02* (2013.01); *F16H 37/0846* (2013.01);
(Continued)

(58) Field of Classification Search
CPC .... F16H 61/702; F16H 37/02; F16H 37/0846; F16H 37/662; F16H 2037/026
See application file for complete search history.

(56) References Cited

U.S. PATENT DOCUMENTS 4,955,260 A * 9/1990 Oshidari ........... F16H 61/66259
                                                              474/28
4,984,486 A    1/1991 Takada et al.
(Continued)

FOREIGN PATENT DOCUMENTS

CN    1779295 A    5/2006
JP    H10-252875 A    9/1998
(Continued)

OTHER PUBLICATIONS

Oct. 13, 2015 Search Report issued in International Patent Application No. PCT/JP2015/070090.
(Continued)

*Primary Examiner* — Tinh Dang
(74) *Attorney, Agent, or Firm* — Oliff PLC

(57) ABSTRACT

A hydraulic control device where the engagement pressure which is supplied from the first solenoid valve is supplied to the synchronization mechanism in the case where the signal pressure is not supplied to the switching valve, and the engagement pressure which is supplied from the first solenoid valve is supplied to the engagement element and the
(Continued)

source pressure is supplied to the synchronization mechanism as the engagement pressure in the case where the signal pressure is supplied to the switching valve.

20 Claims, 10 Drawing Sheets

(51) Int. Cl.
    *F16H 37/08*     (2006.01)
    *F16H 61/02*     (2006.01)
    *F16H 61/662*     (2006.01)

(52) U.S. Cl.
    CPC ....... *F16H 61/0206* (2013.01); *F16H 61/662* (2013.01); *F16H 37/022* (2013.01); *F16H 2037/026* (2013.01)

(56) References Cited

U.S. PATENT DOCUMENTS

| | | | | |
|---|---|---|---|---|
| 5,157,993 | A * | 10/1992 | Abo | F16H 37/021 188/DIG. 1 |
| 5,194,052 | A * | 3/1993 | Ueda | F16H 37/086 475/66 |
| 5,935,039 | A * | 8/1999 | Sakai | F16H 37/086 476/10 |
| 5,980,420 | A * | 11/1999 | Sakamoto | F16H 37/086 476/10 |
| 6,030,311 | A * | 2/2000 | Osumi | F16H 37/086 476/42 |
| 6,063,002 | A * | 5/2000 | Nobumoto | F16H 61/6648 477/41 |
| 6,206,802 | B1 | 3/2001 | Kim | |
| 6,358,179 | B1 * | 3/2002 | Sakai | B60W 10/02 475/216 |
| 6,436,001 | B1 | 8/2002 | Sakai et al. | |
| 6,932,739 | B2 * | 8/2005 | Miyata | F16H 61/061 475/216 |
| 7,736,270 | B2 | 6/2010 | Gierer et al. | |
| 9,523,417 | B2 * | 12/2016 | Nakagawa | F16H 37/022 |
| 2006/0111207 | A1 | 5/2006 | Ogata et al. | |
| 2008/0236917 | A1 * | 10/2008 | Abe | B60K 6/365 180/65.235 |
| 2010/0081546 | A1 | 4/2010 | Yoshioka et al. | |
| 2010/0126816 | A1 | 5/2010 | Takei et al. | |
| 2015/0087463 | A1 | 3/2015 | Nakagawa et al. | |
| 2016/0305520 | A1 | 10/2016 | Walter | |

FOREIGN PATENT DOCUMENTS

| | | |
|---|---|---|
| JP | 2001-050387 A | 2/2001 |
| JP | 2001-099295 A | 4/2001 |
| JP | 2001-214966 A | 8/2001 |
| JP | 2015-218899 A | 12/2015 |
| WO | 2013/176208 A1 | 11/2013 |
| WO | 2015/086018 A2 | 6/2015 |
| WO | 2015/146601 A1 | 10/2015 |
| WO | 2016/013441 A1 | 1/2016 |

OTHER PUBLICATIONS

Feb. 14, 2017 International Search Report issued in Patent Application No. PCT/JP2016/084389.
Aug. 8, 2019 Office Action issued in U.S Patent Appl. No. 15/774,101.
U.S. Appl. No. 15/774,101 filed May 7, 2018 in the name of ASAI et al.
Nov. 6, 2019 Notice of Allowance issued in U.S. Appl. No. 15/774,101.
Dec. 18, 2019 Notice of Allowance and Fee(s) Due issued in U.S. Appl. No. 15/744,101.

* cited by examiner

FIG. 2

| TRAVEL DIRECTION | TRAVEL MODE | FIRST CLUTCH C1 | SECOND CLUTCH C2 | SYNCHRONIZ- ATION MECHANISM S1 | FIRST BRAKE B1 |
|---|---|---|---|---|---|
| FORWARD | NON- CONTINUOUSLY- VARIABLE MODE | ○ | | ○ | |
| FORWARD | CONTINUOUSLY- VARIABLE MODE | | ○ | (○) | |
| REVERSE | NON- CONTINUOUSLY- VARIABLE MODE | | | ○ | ○ |

HYDRAULIC CONTROL DEVICE FOR AUTOMATIC TRANSMISSION

BACKGROUND

The present disclosure relates to a hydraulic control device for an automatic transmission.

Automatic transmissions that use a belt-type continuously variable speed change mechanism that includes a pair of pulleys and a belt (or a chain) wound around the pulleys and made of metal and that continuously varies a speed by changing the effective diameters of the pulleys have been widespread as automatic transmissions that are suitable for use in vehicles, for example. There have also been known automatic transmissions that use a toroidal-type continuously variable speed change mechanism or a cone-ring-type continuously variable speed change mechanism, besides the belt-type continuously variable speed change mechanism.

There has further been developed an automatic transmission that has two parallel power transfer paths, namely a first power transfer path that couples an input shaft and an output shaft to each other via a forward/reverse switching device and a second power transfer path that couples the input shaft and the output shaft to each other via a continuously variable speed change mechanism (see International Patent Application Publication No. WO 2013/176208). In the automatic transmission, the forward/reverse switching device has a first clutch to be engaged only during forward travel and a brake to be engaged only during reverse travel, a synchronization mesh mechanism (hereinafter referred to as a "synchronization mechanism") is provided in the first power transfer path, and a second clutch is provided in the second power transfer path.

In the automatic transmission, when the vehicle starts to travel in the forward direction or when the vehicle travels forward at a speed that is less than a predetermined speed, a first mode (non-continuously-variable mode) in which the vehicle travels using a low forward speed without performing continuously variable speed change with the first clutch and the synchronization mechanism in the engaged state and with the second clutch in the disengaged state is entered so that drive torque from a drive source is transferred from the input shaft to the output shaft through the first power transfer path. When the vehicle travels forward at a speed that is not less than the predetermined speed, meanwhile, a second mode (continuously-variable mode) in which the second clutch is in the engaged state and in which the first clutch and a dog clutch are in the disengaged state is entered so that drive torque from the drive source is transferred from the input shaft to the output shaft through the second power transfer path.

SUMMARY

However, the automatic transmission described in International Patent Application Publication No. WO 2013/176208 includes four engagement elements, namely the first clutch, the second clutch, the synchronization mechanism, and the brake, and the engagement elements are actuated by a hydraulic control device. Here, in normal hydraulic control devices, one solenoid valve such as a linear solenoid valve is provided for each engagement element. Therefore, four solenoid valves are provided in order to control the four engagement elements discussed above, which makes it difficult to reduce the size and the weight of the valve body.

An exemplary aspect of the disclosure provides a hydraulic control device for an automatic transmission with a reduced number of solenoid valves.

The present disclosure provides a A hydraulic control device for an automatic transmission that includes: an input shaft drivably coupled to a drive source of a vehicle; a driving shaft drivably coupled to wheels; a synchronization mechanism; and an engagement element provided at at least one location in a first power transfer path that couples the input shaft and the driving shaft to each other via the synchronization mechanism and a second power transfer path that couples the input shaft and the driving shaft to each other at least partially through a path that is different from the first power transfer path, wherein the automatic transmission is switchable between a first mode, in which the synchronization mechanism is brought into an engaged state to connect the input shaft and the driving shaft to each other through the first power transfer path for rotation transfer, and a second mode, in which the synchronization mechanism is brought into a disengaged state to connect the input shaft and the driving shaft to each other through the second power transfer path for rotation transfer, and an engagement pressure is supplied to and discharged from the synchronization mechanism and the engagement element, the hydraulic control device comprising: a first solenoid valve capable of supplying the engagement pressure, and a switching valve capable of supplying the engagement pressure, which is supplied from the first solenoid valve, switchably to one of the synchronization mechanism and the engagement element.

The hydraulic control device for an automatic transmission is provided with the switching valve which is capable of supplying the engagement pressure, which is supplied from the first solenoid valve, switchably to one of the synchronization mechanism and the engagement element. Thus, the first solenoid valve can be commonly used for the synchronization mechanism and the engagement element as the source of supply of the engagement pressure. Consequently, the number of solenoid valves can be reduced compared to the case where individual solenoid valves are used for the synchronization mechanism and the engagement element, which can reduce the size and the weight of the valve body etc.

BRIEF DESCRIPTION OF THE DRAWINGS

FIG. 2 is an engagement table of the automatic transmission according to the first embodiment.

FIG. 7 illustrates a hydraulic control device according to a second embodiment, in which

FIG. 8 illustrates a hydraulic control device according to a third embodiment, in which

DETAILED DESCRIPTION OF EMBODIMENTS

First Embodiment

Figure 1:
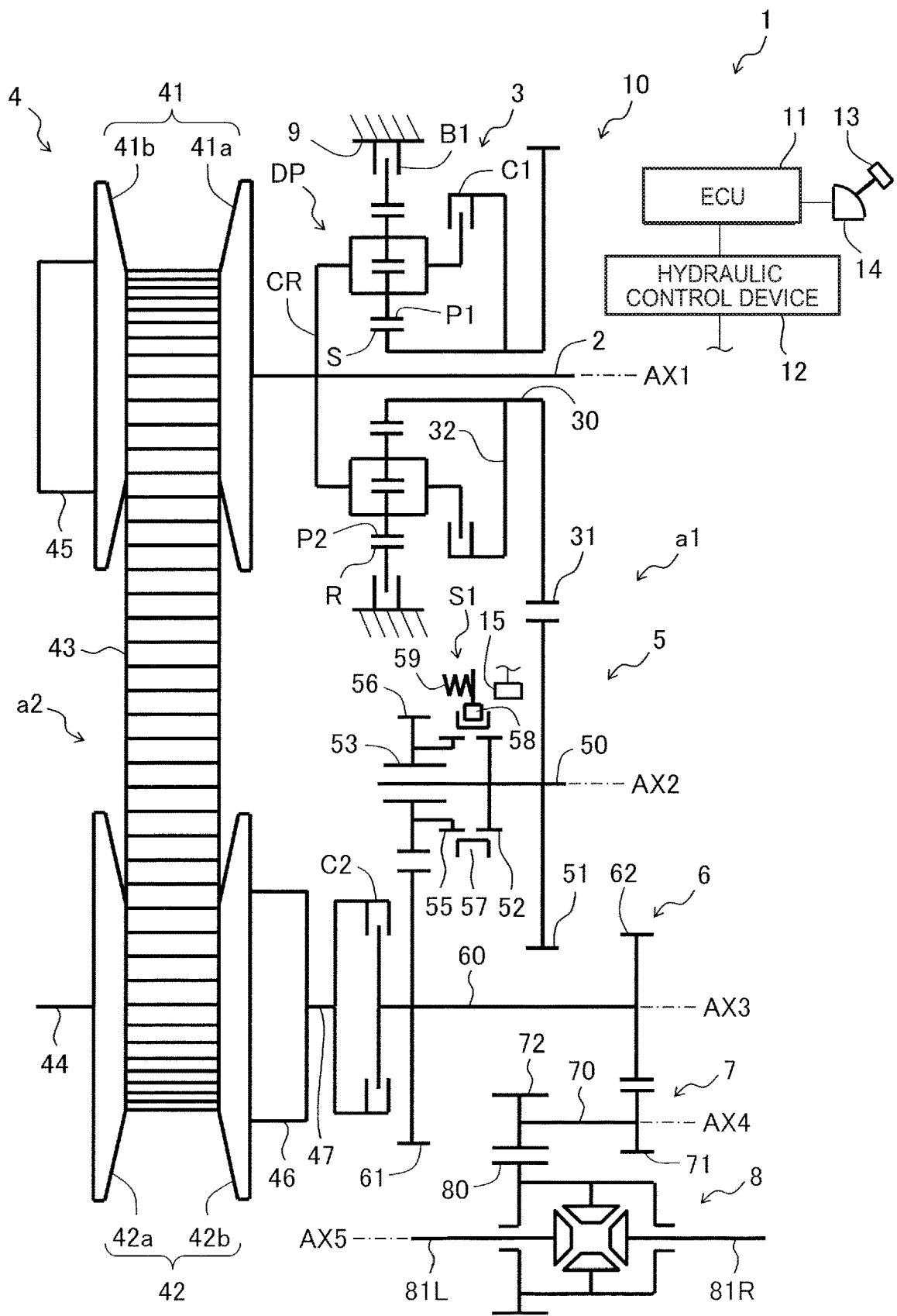
FIG. 1 is a skeleton diagram illustrating an automatic transmission according to a first embodiment.

A hydraulic control device 12 for an automatic transmission 10 according to a first embodiment will be described below with reference to FIGS. 1 to 6B. The term "drivably coupled" as used herein refers to a state in which rotary elements are coupled to each other in such a way that allows transfer of a drive force, which includes a state in which the rotary elements are coupled to each other so as to rotate together with each other, and a state in which the rotary elements are coupled to each other via a clutch or the like in such a way that allows transfer of a drive force.

A schematic configuration of a vehicle 1 that includes the automatic transmission 10 according to the embodiment will be described with reference to FIG. 1. The vehicle 1 includes the automatic transmission 10, a control device (ECU) 11, and the hydraulic control device 12.

The automatic transmission 10 includes a torque converter (not illustrated), a forward/reverse switching device 3 that has an input shaft 2, a continuously variable speed change mechanism 4, a speed-reduction gear mechanism 5, an output gear portion 6 that has a driving shaft 60, a counter shaft portion 7, a differential device 8, and a transmission case 9 that houses such components. In addition, the automatic transmission 10 includes a first power transfer path a1 that couples the input shaft 2 of the forward/reverse switching device 3 and the driving shaft 60 of the output gear portion 6 to each other via the forward/reverse switching device 3, and a second power transfer path a2 that couples the input shaft 2 and the driving shaft 60 to each other at least partially through a path that is different from the first power transfer path a1 and via the continuously variable speed change mechanism 4. In addition, the automatic transmission 10 includes axes that are parallel to each other, namely a first axis AX1 to a fifth axis AX5.

The first axis AX1 is coaxial with a crankshaft of an internal combustion engine (drive source) (not illustrated). Disposed on the first axis AX1 are: an input shaft of the automatic transmission 10 coupled to the crankshaft; the torque converter; the input shaft 2 of the forward/reverse switching device 3 and the continuously variable speed change mechanism 4; a planetary gear DP, a first clutch (forward engagement element, engagement element) C1, and a first brake (reverse engagement element, engagement element) B1 of the forward/reverse switching device 3; and a primary pulley 41 of the continuously variable speed change mechanism 4.

The speed-reduction gear mechanism 5 is disposed on the second axis AX2. A secondary pulley 42 of the continuously variable speed change mechanism 4, a second clutch (engagement element) C2, and the output gear portion 6 are disposed on the third axis AX3. The counter shaft portion 7 is disposed on the fourth axis AX4. The differential device 8 and left and right drive shafts 81L and 81R are disposed on the fifth axis AX5.

The input shaft of the automatic transmission 10, which is coupled to the crankshaft is coupled to the input shaft 2 of the forward/reverse switching device 3 and the continuously variable speed change mechanism 4 via the torque converter. The forward/reverse switching device 3 includes the planetary gear DP, the first brake B1, and the first clutch C1, and is configured for transfer with the rotational direction switched in accordance with the travel direction of the vehicle 1. The input shaft 2 extends radially inside the planetary gear DP to be connected to the primary pulley 41 of the continuously variable speed change mechanism 4, and to be connected to a carrier CR of the planetary gear DP. The planetary gear DP is constituted of a so-called double-pinion planetary gear that has a sun gear S, a ring gear R, and the carrier CR which rotatably supports a pinion P1 meshed with the sun gear S and a pinion P2 meshed with the ring gear R. Rotation of the ring gear R with respect to the transmission case 9 can be locked by the first brake B1. In addition, the sun gear S is directly coupled to a hollow shaft 30, the carrier CR is connected to the hollow shaft 30 via the first clutch C1, and the hollow shaft 30 is coupled to a forward/reverse rotation output gear 31. The hollow shaft 30 is also coupled to a clutch drum 32 of the first clutch C1. The forward/reverse rotation output gear 31, the hollow shaft 30, and the clutch drum 32 integrally constitute a rotary member.

The first clutch C1 is configured to form a path for transferring rotation in the forward direction of the vehicle 1 when the first clutch C1 is engaged. The first brake B1 is configured to form a path for transferring rotation in the reverse direction of the vehicle 1 when the first brake B1 is engaged. The forward/reverse rotation output gear 31 is meshed with an input gear 51 of the speed-reduction gear mechanism 5.

The speed-reduction gear mechanism 5 includes: a first rotary shaft 50 disposed on the second axis AX2; the input gear 51 which is provided on the first rotary shaft 50; a synchronization mechanism (synchronization mesh mechanism) S1 provided on the first rotary shaft 50 and provided in the first power transfer path a1; and a second rotary shaft 53 and an output gear 56 constituted of a hollow shaft that is relatively rotatable with respect to the first rotary shaft 50. The input gear 51 is integrally fixed and coupled to one side of the first rotary shaft 50. The second rotary shaft 53 is supported on the outer periphery of the other side of the first rotary shaft 50 so as to be relatively rotatable through a needle bearing (not illustrated), for example. That is, the second rotary shaft 53 is disposed as a double shaft that overlaps the first rotary shaft 50 in the axial direction. The output gear 56 is integrally fixed and coupled to the second rotary shaft 53. The output gear 56 is meshed with an input gear 61 of the output gear portion 6.

The synchronization mechanism S1 includes a drive gear 52, a driven gear 55, a synchronizer (not illustrated), a sleeve 57, a shift fork 58, an urging spring (urging portion) 59, and a synchronization detection section 15, and can engage and disengage the first rotary shaft 50 and the second rotary shaft 53 with and from each other.

The drive gear 52 is smaller in diameter than the input gear 51, and is integrally fixed and coupled to one side of the first rotary shaft 50. The driven gear 55 is the same in diameter as the drive gear 52 and smaller in diameter than the output gear 56, and is integrally fixed and coupled to the second rotary shaft 53. The synchronizer is disposed on the drive gear 52 side of the driven gear 55.

A tooth surface is formed on the inner peripheral surface of the sleeve 57. The sleeve 57 is disposed radially outward of the drive gear 52 and the driven gear 55 so as to be movable in the axial direction. The sleeve 57 is driven to be moved in the axial direction by the shift fork 58 which is driven by a hydraulic servo 93 (see FIG. 3) to be discussed later to be driven to be slid between a position at which the sleeve 57 is meshed with only the drive gear 52 and a position at which the sleeve 57 is meshed with both the drive gear 52 and the driven gear 55. Consequently, the drive gear 52 and the driven gear 55 can be switched between the disengaged state (disconnected state) and the engaged state (drivably coupled state).

The urging spring 59 applies an urging force to the shift fork 58 in the direction in which the drive gear 52 and the driven gear 55 are brought into the disengaged state. Therefore, when an engagement pressure PSLG or a modulator pressure $P_{LPM2}$ is supplied to the hydraulic servo 93, the hydraulic servo 93 moves the shift fork 58 against the urging force of the urging spring 59 so as to bring the drive gear 52 and the driven gear 55 into the engaged state. When a hydraulic pressure is drained from the hydraulic servo 93, meanwhile, the urging spring 59 moves the shift fork 58 so as to bring the drive gear 52 and the driven gear 55 into the disengaged state. That is, the synchronization mechanism S1 is maintained in the engaged state (actuated state) when the engagement pressure PSLG or the modulator pressure $P_{LPM2}$ is supplied, and the urging spring 59 switches the synchronization mechanism S1 into the disengaged state when the engagement pressure PSLG or the modulator pressure $P_{LPM2}$ is not supplied.

The synchronization detection section 15 is configured to detect whether or not the synchronization mechanism S1 is in the engaged state, and to transmit the detection result to the ECU 11. A sensor, a switch, or the like that detects movement of a movable member of the hydraulic servo 93 or a movable member such as tire shift fork 58 and the sleeve 57, for example, can be applied as the synchronization detection section 15.

The continuously variable speed change mechanism 4 can continuously change the speed ratio. In the embodiment, a belt-type automatic continuously variable speed change mechanism is applied as the continuously variable speed change mechanism 4. It should be noted, however, that the present disclosure is not limited thereto, and a toroidal-type continuously variable speed change mechanism or a cone-ring-type continuously variable speed change mechanism, for example, may be applied as the continuously variable speed change mechanism 4. The continuously variable speed change mechanism 4 is configured to include: the primary pulley 41 which is connected to the input shaft 2; the secondary pulley 42; and an endless belt 43 wound around the primary pulley 41 and the secondary pulley 42. The primary pulley 41 has a fixed sheave 41*a* and a movable sheave 41*b* that have respective wall surfaces formed in a conical shape so as to oppose each other, the fixed sheave 41*a* being fixed so as to be immovable in the axial direction with respect to the input shaft 2, and the movable sheave 41*b* being supported so as to be movable in the axial direction with respect to the input shaft 2. The belt 43 is held by a groove portion with a V-shape in section formed by the fixed sheave 41*a* and the movable sheave 41*b*.

Similarly, the secondary pulley 42 has a fixed sheave 42*a* and a movable sheave 42*b* that have respective wall surfaces formed in a conical shape so as to oppose each other, the fixed sheave 42*a* being fixed so as to be immovable in the axial direction with respect to the center shaft 44, and the movable sheave 42*b* being supported so as to be movable in the axial direction with respect to the center shaft 44. The belt 43 is held by a groove portion with a V-shape in section formed by the fixed sheave 42*a* and the movable sheave 42*b*. The fixed sheave 41*a* of the primary pulley 41 and the fixed sheave 42*a* of the secondary pulley 42 are disposed on the opposite sides of the belt 43 in the axial direction.

In addition, a hydraulic servo 45 is disposed on the back surface side of the movable sheave 41*b* of the primary pulley 41, and a hydraulic servo 46 is disposed on the back surface side of the movable sheave 42*b* of the secondary pulley 42. A primary pressure is supplied to the hydraulic servo 45 as a working oil pressure from a primary pressure control valve (not illustrated) of the hydraulic control device 12. A secondary pressure is supplied to the hydraulic servo 46 as a working oil pressure from a secondary pressure control valve (not illustrated) of the hydraulic control device 12. The hydraulic servos 45 and 46 are configured to be supplied with the working oil pressures to generate a belt holding force corresponding to load torque, and to generate a holding force for changing or fixing the speed ratio.

An output shaft 47 of the movable sheave 42*b* of the secondary pulley 42 is connected to the driving shaft 60 of the output gear portion 6 via the second clutch C2. That is, the second clutch C2 is provided in the second power transfer path a2. The output gear portion 6 is configured to have the driving shaft 60, the input gear 61 which is fixed and coupled to one end of the driving shaft 60, and a counter gear 62 fixed and coupled to the other end of the driving shaft 60. The counter gear 62 is meshed with a drive gear 71 of the counter shaft portion 7.

The counter shaft portion 7 is configured to have a counter shaft 70, the drive gear 71 which is fixed and coupled to the counter shaft 70, and a driven gear 72 fixed and coupled to the counter shaft 70. The driven gear 72 is meshed with a differential ring gear 80 of the differential device 8.

The differential device 8 is configured to transfer rotation of the differential ring gear 80 to the left and right drive shafts 81L and 81R while absorbing a difference in rotation therebetween. The left and right drive shafts 81L and 81R are coupled to left and right wheels (not illustrated), respectively. The differential ring gear 80 is meshed with the driven gear 72, and the drive gear 71 is meshed with the counter gear 62. Thus, the driving shaft 60 of the output gear portion 6, the counter shaft 70 of the counter shaft portion 7, and the differential device 8 are drivably coupled to the wheels via the left and right drive shafts 81L and 81R to always operate in conjunction with the wheels.

The ECU 11 includes a CPU, a ROM that stores a processing program, a RAM that temporarily stores data, input and output ports, and a communication port, for example, and is configured to output various types of signals, such as a control signal for the hydraulic control device 12, from the output port. The vehicle 1 is provided with a shift lever 13 that enables a driver to perform an operation to select a travel range, and a shift position detection section 14 that detects the shift position of the shift lever 13. The shift position detection section 14 and the synchronization detection section 15 are connected to the ECU 11 via the input port.

The ECU 11 is configured to control a secondary control pressure (resisting pressure) PSLS to be discussed later so as to bring a switching valve 27 into the reverse state (see t2 and later in FIG. 6A and t13 and later in FIG. 6B) in the case where the synchronization detection section 15 detects that the synchronization mechanism S1 is in the engaged state and the shift position detection section 14 detects that the travel range is the reverse range. Meanwhile, the ECU 11 is configured to control the secondary control pressure PSLS so as to bring the switching valve 27 into the non-reverse state (see t11 to t13 in FIG. 6B) in the case where the synchronization detection section 15 detects that the synchronization mechanism S1 is not in the engaged state and the shift position detection section 14 detects that the travel range is the reverse range. In addition, the ECU 11 includes a timer function for measuring the time elapsed since it is detected that the shift position is switched to the R range (see step S8 in FIG. 4). In addition, the ECU 11 includes a tinier function for measuring the time elapsed since an instruction to lower the secondary control pressure PSLS is issued (see step S20 in FIG. 5).

In the automatic transmission 10 configured as described above, the first clutch C1, the second clutch C2, the synchronization mechanism S1, and the first brake B1 illustrated in the skeleton diagram of FIG. 1 are engaged and disengaged in combinations indicated in the engagement table of FIG. 2 to establish a forward non-continuously-variable mode (first mode), a forward continuously-variable mode (second mode), and a reverse non-continuously-variable mode. In the embodiment, the non-continuously-variable mode, which corresponds to the first mode, means a forward first speed or a reverse first speed with which the drive force is rotationally transferred through the first power transfer path a1. However, the present disclosure is not limited thereto, and multi-step speed change may be meant. In the embodiment, meanwhile, the continuously-variable mode, which corresponds to the second mode, means forward continuously variable speed change with which the drive force is rotationally transferred through the second power transfer path a2.

Figure 3:
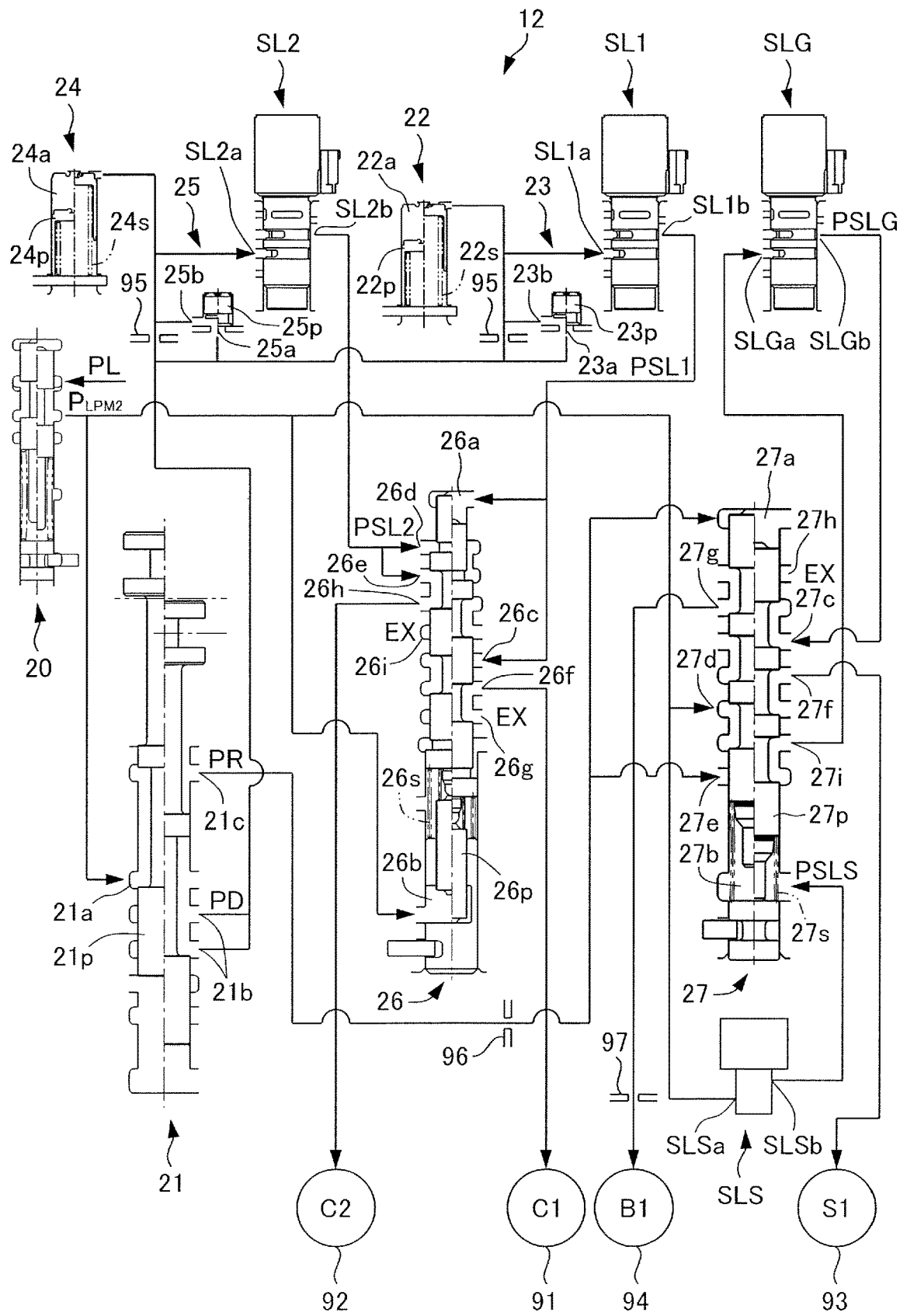
FIG. 3 is a block diagram illustrating a hydraulic control device according to the first embodiment.

The hydraulic control device 12 regulates a hydraulic pressure generated by an oil pump (not illustrated) to a line pressure PL and the secondary pressure on the basis of the throttle opening using a primary regulator valve and a secondary regulator valve. As illustrated in FIG. 3, the hydraulic control device 12 includes: a line pressure modulator valve (source pressure generator) 20; a manual valve 21; a linear solenoid valve SL1; an accumulator 22 and a check valve 23 connected to the linear solenoid valve SL1; a linear solenoid valve SL2; an accumulator 24 and a check valve 25 connected to the linear solenoid valve SL2; a clutch application control valve 26; the switching valve (synchronization mechanism application control valve) 27; a linear solenoid valve (first solenoid valve) SLG; a primary linear solenoid valve SLP (see FIG. 7A); a secondary linear solenoid valve (second solenoid valve) SLS; and so forth.

The hydraulic control device 12 is connected to: a hydraulic servo 91 that can be actuated by a hydraulic pressure to engage and disengage the first clutch C1; a hydraulic servo 92 that can be actuated by a hydraulic pressure to engage and disengage the second clutch C2; the hydraulic servo 93 which can be actuated by a hydraulic pressure to engage and disengage the synchronization mechanism S1; and a hydraulic servo 94 that can be actuated by a hydraulic pressure to engage and disengage the first brake B1. In addition, the primary linear solenoid valve SLP supplies a primary control pressure PSLP to the primary pressure control valve to regulate a primary pressure to be supplied from the primary pressure control valve to the hydraulic servo 45 (see FIG. 1) for the continuously variable speed change mechanism 4. Further, the secondary linear solenoid valve SLS supplies the secondary control pressure PSLS to the secondary pressure control valve to regulate the secondary pressure to be supplied from the secondary pressure control valve to the hydraulic servo 46 (see FIG. 1) for the continuously variable speed change mechanism 4.

Consequently, the hydraulic control device 12 is configured to supply and discharge the engagement pressure in accordance with an instruction from the ECU 11 to control speed change of the continuously variable speed change mechanism 4, engagement and disengagement of the first clutch C1, the second clutch C2, the first brake B1, and the synchronization mechanism S1, and so forth. That is, with the hydraulic control device 12 according to the embodiment, three linear solenoid valves, namely the linear solenoid valve SL1, the linear solenoid valve SL2, and the linear solenoid valve SLG, are utilized to engage and disengage four engagement elements, namely the first clutch C1, the second clutch C2, the first brake B1, and the synchronization mechanism S1.

The line pressure modulator valve 20 is configured to regulate the line pressure PL to generate the modulator pressure (source pressure, engagement pressure) $P_{LPM2}$, which is a constant pressure that is lower than the line pressure PL.

The manual valve 21 includes: a spool 21p that is mechanically or electrically moved in accordance with an operation of the shift lever 13 (see FIG. 1); an input port 21a to which the modulator pressure $P_{LPM2}$ is input; an output port 21b that outputs the modulator pressure $P_{LPM2}$ as a forward range pressure PD in the case where the spool 21p is at a D (drive) range position; and an output port 21c that outputs the modulator pressure $P_{LPM2}$ as a reverse range pressure (signal pressure) PR in the case where the spool 21p is at an R (reverse) range position.

The linear solenoid valve SL1 includes: an input port SL1a to which the forward range pressure PD is input; and an output port SL1b that communicates with a first working oil chamber 26a and a first input port 26c of the clutch application control valve 26 to be discussed later. The linear solenoid valve SL1 is configured to freely regulate the input forward range pressure PD, to generate an engagement pressure PSL1 to be supplied to the hydraulic servo 91, and to supply the engagement pressure PSL1 from the output port SL1b.

The accumulator 22 includes: a movable member 22p; a spring 22s constituted of a compression coil spring that presses the movable member 22p; and a pressure accumulation oil chamber 22a configured to push in the movable member 22p against the spring 22s to accumulate a pressure. The pressure accumulation oil chamber 22a can accumulate the forward range pressure PD. The accumulator 22 is configured to keep supplying a hydraulic pressure corresponding to the forward range pressure PD to the linear solenoid valve SL1 for a certain time when no forward range pressure PD is provided when the manual valve 21 is switched, so that garage exit control is performed using the linear solenoid valve SL1.

The check valve 23 includes: an input port 23a to which the forward range pressure PD is supplied; an output port 23b that communicates with the pressure accumulation oil chamber 22a of the accumulator 22 and the input port SL1a of the linear solenoid valve SL1; a sealing member 23p that can switchably allow and block communication between the input port 23a and the output port 23b; and a spring (not illustrated). The spring is configured to urge the sealing member 23p so as to block communication between the input port 23a and the output port 23b, and to allow communication from the input port 23a toward the output port 23b at a hydraulic pressure that is lower than the forward range pressure PD. Therefore, when the forward range pressure PD is input to the input port 23a, the sealing member 23p is switched against the spring to allow communication between the input port 23a and the output port 23b so that a hydraulic pressure can flow in only one direction from the input port 23a to the output port 23b.

An orifice 95 is disposed in an oil passage that allows communication between an oil passage that allows communication between the output port 21b of the manual valve 21 and the input port 23a of the check valve 23 and an oil passage that allows communication between the output port 23b of the check valve 23 and the input port SL1a of the linear solenoid valve SL1. Consequently, it is possible to extend the time over which the accumulator 22 can supply a hydraulic pressure corresponding to the forward range pressure PD to the linear solenoid valve SL1 with no forward range pressure PD provided, compared to a case where the orifice 95 is not provided.

The linear solenoid valve SL2 includes: an input port SL2a to which the forward range pressure PD is input; and an output port SL2b that communicates with a second input port 26d and a third input port 26e of the clutch application control valve 26. The linear solenoid valve SL2 is configured to freely regulate the input forward range pressure PD, to generate an engagement pressure PSL2 to be supplied to the hydraulic servo 92, and to supply the engagement pressure PSL2 from the output port SL2b. The accumulator 24, the check valve 25, and the orifice 95 are connected to the linear solenoid valve SL2. Such components are similar in configuration to the accumulator 22, the check valve 23, and the orifice 95 which are connected to the linear solenoid valve SL1 discussed above, and thus will not be described in detail.

The clutch application control valve 26 includes: a spool 26p that can be switched between a position (normal state) (hereinafter referred to as a "left-half position") indicated in the left half in the drawing and a position (tie-up prevention state) (hereinafter referred to as a "right-half position") indicated in the right half in the drawing; and a spring 26s constituted of a compression coil spring that urges the spool 26p toward the left-half position. The clutch application control valve 26 includes: the first working oil chamber 26a to which the engagement pressure PSL1 is input in the direction in which the spool 26p is pressed toward the right-half position; and a second working oil chamber 26b to which the modulator pressure $P_{LPM2}$ is input in the direction in which the spool 26p is pressed toward the left-half position. The clutch application control valve 26 also includes: the first input port 26c to which the engagement pressure PSL1 is input; and the second input port 26d and the third input port 26e to which the engagement pressure PSL2 is input. The clutch application control valve 26 further includes: a first output port 26f that communicates with the hydraulic servo 91; a drain port 26g; a second output port 26h that communicates with the hydraulic servo 92; and a drain port 26i.

The pressure receiving area of the spool 26p is set to be the same for the first working oil chamber 26a and the second working oil chamber 26b. For the second input port 26d, meanwhile, the pressure receiving area of the spool 26p is set to be different between both sides in the axial direction of the spool 26p such that the pressure receiving area for pressing the spool 26p toward the right-half position is larger. Further, the urging force of the spring 26s is set to be smaller than the pressing force for pressing the spool 26p toward the right-half position due to the difference in pressure receiving area of the spool 26p when the engagement pressure PSL2 is supplied to the second input port 26d. Consequently, in the case where the linear solenoid valves SL1 and SL2 are actuated concurrently so that the engagement pressure PSL1 and PSL2 are output concurrently, the engagement pressure PSL1 and the modulator pressure $P_{LPM2}$ cancel each other on both end surfaces of the spool 26p, and the pressing force for pressing the spool 26p toward the right-half position due to the difference in pressure receiving area of the spool 26p when the engagement pressure PSL2 is supplied to the second input port 26d overcomes the spring 26s so that the spool 26p is switched to the right-half position.

The clutch application control valve 26 is configured such that communication between the first input port 26c and the first output port 26f is allowed and communication between the third input port 26e and the second output port 26h is allowed when the spool 26p is in the normal state at the left-half position. Meanwhile, the clutch application control valve 26 is configured such that communication between the first input port 26c and the first output port 26f is blocked, communication between the first output port 26f and the drain port 26g is allowed, communication between the third input port 26e and the second output port 26h is blocked, and communication between the second output port 26h and the drain port 26i is allowed when the spool 26p is in the tie-up prevention state at the right-half position.

Thus, in the case where the linear solenoid valve SL1 is actuated and the linear solenoid valve SL2 is not actuated, the engagement pressure PSL1 is supplied to the hydraulic servo 91 with the clutch application control valve 26 kept in the normal state. In the case where the linear solenoid valve SL2 is actuated and the linear solenoid valve SL1 is not actuated, meanwhile, the engagement pressure PSL2 is supplied to the hydraulic servo 92 with the clutch application control valve 26 kept in the normal state. In the case where both the linear solenoid valves SL1 and SL2 are actuated, further, the clutch application control valve 26 is switched to the tie-up prevention state, and a hydraulic pressure is drained from both the hydraulic servos 91 and 92. However, the present disclosure is not limited thereto, and a hydraulic pressure may be drained from one of the hydraulic servos 91 and 92, and the other may be engaged. Consequently, it is possible to prevent the hydraulic servo 91 and the hydraulic servo 92 from being supplied with an engagement pressure concurrently, and thus to prevent occurrence of tie-up due to concurrent engagement of the first clutch C1 and the second clutch C2.

The linear solenoid valve SLG includes: an input port SLGa that communicates with a third output port 27i of the switching valve 27; and an output port SLGb that communicates with a first input port 27c of the switching valve 27. The linear solenoid valve SLG is configured to freely regulate the modulator pressure $P_{LPM2}$ or the reverse range pressure PR which has been input, to generate the engagement pressure PSLG to be supplied to either of the hydraulic servos 93 and 94, and to supply the engagement pressure PSLG from the output port SLGb.

The secondary linear solenoid valve SLS includes: an input port SLSa to which the modulator pressure $P_{LPM2}$ is input; and an output port SLSb that communicates with a second working oil chamber 27b of the switching valve 27. The secondary linear solenoid valve SLS is configured to freely regulate the input modulator pressure $P_{LPM2}$ to generate the secondary control pressure PSLS to supply the secondary control pressure PSLS from the output port SLSb to the switching valve 27 as a resisting pressure. The output port SLSb communicates with a secondary pressure control valve (not illustrated).

The switching valve 27 includes: a spool 27p that can be switched between a position (non-reverse state) indicated in the left half in the drawing and a position (reverse state) indicated in the right half in the drawing; and a spring 27s constituted of a compression coil spring that urges the spool 27p toward the left-half position. The switching valve 27 includes: a first working oil chamber 27a to which the reverse range pressure PR is input in the direction in which the spool 27p is pressed toward the right-half position; and the second working oil chamber 27b to which the secondary control pressure PSLS is input in the direction in which the spool 27p is pressed toward the left-half position. The switching valve 27 also includes: the first input port 27c to which the engagement pressure PSLG is input; a second input port 27d to which the modulator pressure $P_{LPM2}$ is input; and a third input port 27e to which the reverse range pressure PR is input. The switching valve 27 further includes: a first output port 27f that communicates with the hydraulic servo 93; a second output port 27g that communicates with the hydraulic servo 94; a drain port 27h; and the third output port 27i which communicates with the input port SLGa of the linear solenoid valve SLG.

An orifice 96 is disposed in an oil passage that allows communication between the first working oil chamber 27a and the third input port 27e and the output port 21c of the manual valve 21. Consequently, it is possible to lower the speed at which the switching valve 27 is switched from the non-reverse state to the reverse state when the travel range is switched from a range other than the reverse range to the reverse range. In particular, it is possible to supply the secondary control pressure PSLS from the secondary linear solenoid valve SLS to the switching valve 27 to maintain the spool 27p in the non-reverse state (see t11 to t13 in FIG. 6B) before the reverse range pressure PR moves the spool 27p of the switching valve 27 in the case where the travel range is switched to the reverse range before the synchronization mechanism S1 is engaged. In addition, it is possible to lower the speed at which the switching valve 27 is switched from the reverse state to the non-reverse state, and hence to reduce the draining speed of the hydraulic servo 93 and the hydraulic servo 94, when the travel range is switched from the reverse range to another range.

An orifice 97 is disposed in an oil passage that allows communication between the second output port 27g and the hydraulic servo 94. Consequently, it is possible to reduce the draining speed of the hydraulic servo 94 after the switching valve 27 is switched from the reverse state to the non-reverse state.

The pressure receiving area of the spool 27p is set to be the same for the first working oil chamber 27a and the second working oil chamber 27b. In addition, the urging force of the spring 27s is set to be smaller than the pressing force for pressing the spool 27p toward the right-half position when the reverse range pressure PR is supplied to the first working oil chamber 27a. Consequently, the spool 27p is switched to the right-half position in the case where the reverse range pressure PR is supplied and the secondary control pressure PSLS is not supplied, and the spool 27p is positioned at the left-half position by the urging force of the spring 27s with the reverse range pressure PR and the secondary control pressure PSLS canceling each other on both end surfaces of the spool 27p in the case where the reverse range pressure PR is supplied and the secondary control pressure PSLS is supplied.

The switching valve 27 is configured such that the first input port 27c is communicated with the first output port 27f but not communicated with the second output port 27g, the second input port 27d is communicated with the third output port 27i but not communicated with the first output port 27f, communication between the second output port 27g and the drain port 27h is allowed, and the third input port 27e is blocked when the spool 27p is in the non-reverse state at the left-half position. Meanwhile, the switching valve 27 is configured such that the first input port 27c is communicated with the second output port 27g but not communicated with the first output port 27f, the second input port 27d is communicated with the first output port 27f but not communicated with the third output port 27i, communication between the third input port 27e and the third output port 27i is allowed, and the drain port 27h is blocked when the spool 27p is in the reverse state at the right-half position.

Thus, in the case where the shift position of the manual valve 21 is a range other than the reverse range and the reverse range pressure PR is not generated, or in the case where the secondary control pressure PSLS is supplied even if the shift position is the reverse range and the reverse range pressure PR is generated, the switching valve 27 is kept in the non-reverse state, and the modulator pressure $P_{LPM2}$ passes through the switching valve 27 to be supplied to the linear solenoid valve SLG, the engagement pressure PSLG passes through the switching valve 27 to be supplied to the hydraulic servo 93, and a hydraulic pressure is drained from the hydraulic servo 94 via the switching valve 27. Meanwhile, in the case where the shift position is the reverse range and the reverse range pressure PR is generated and the secondary control pressure PSLS is not supplied, the switching valve 27 is switched to the reverse state, and the modulator pressure $P_{LPM2}$ passes through the switching valve 27 to be supplied to the hydraulic servo 93, the reverse range pressure PR passes through the switching valve 27 to be supplied to the linear solenoid valve SLG, and the engagement pressure PSLG passes through the switching valve 27 to be supplied to the hydraulic servo 94.

Figure 4:
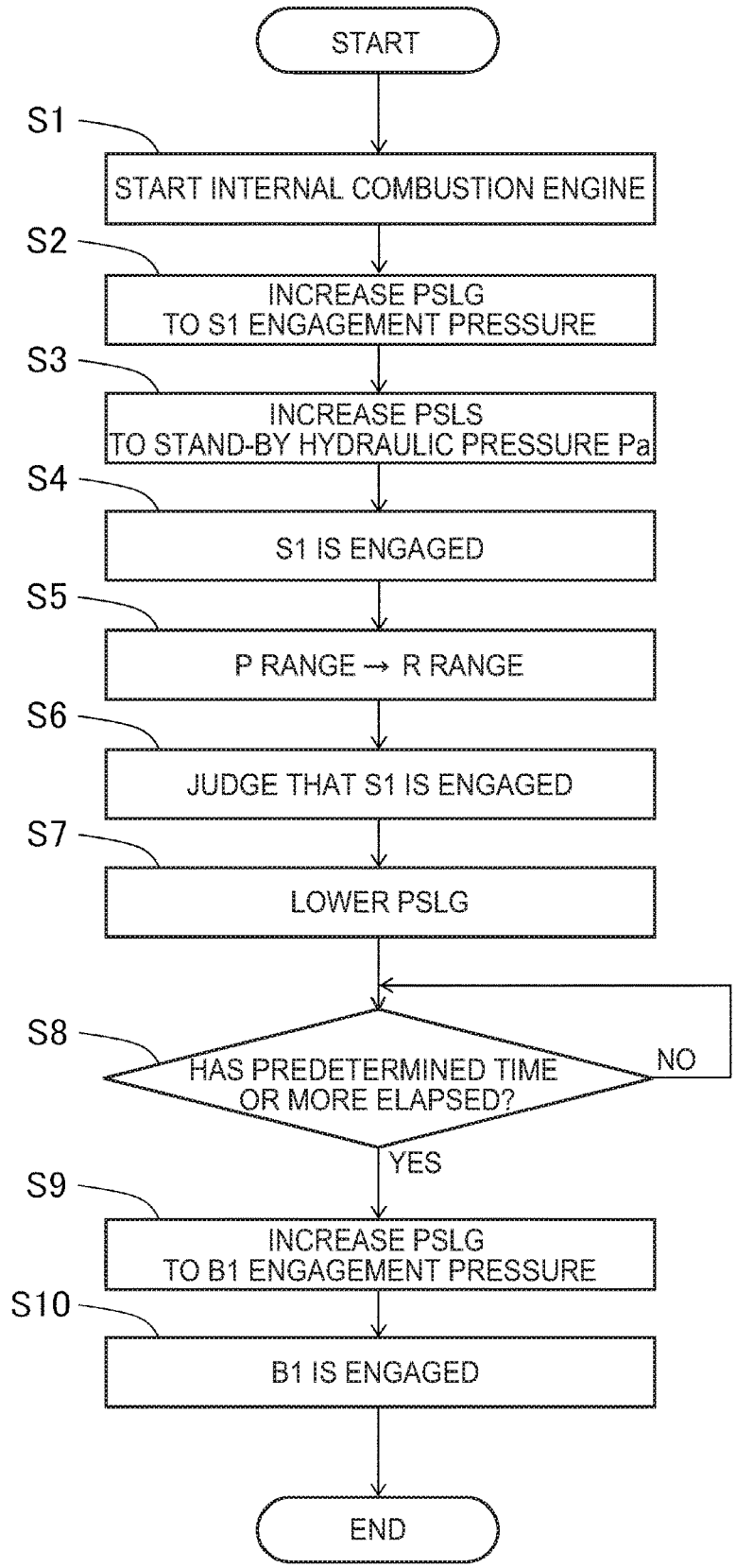
FIG. 4 is a flowchart for a case where a shift change to a reverse range is made after a synchronization mechanism is engaged in the hydraulic control device according to the first embodiment.
Figure 5:
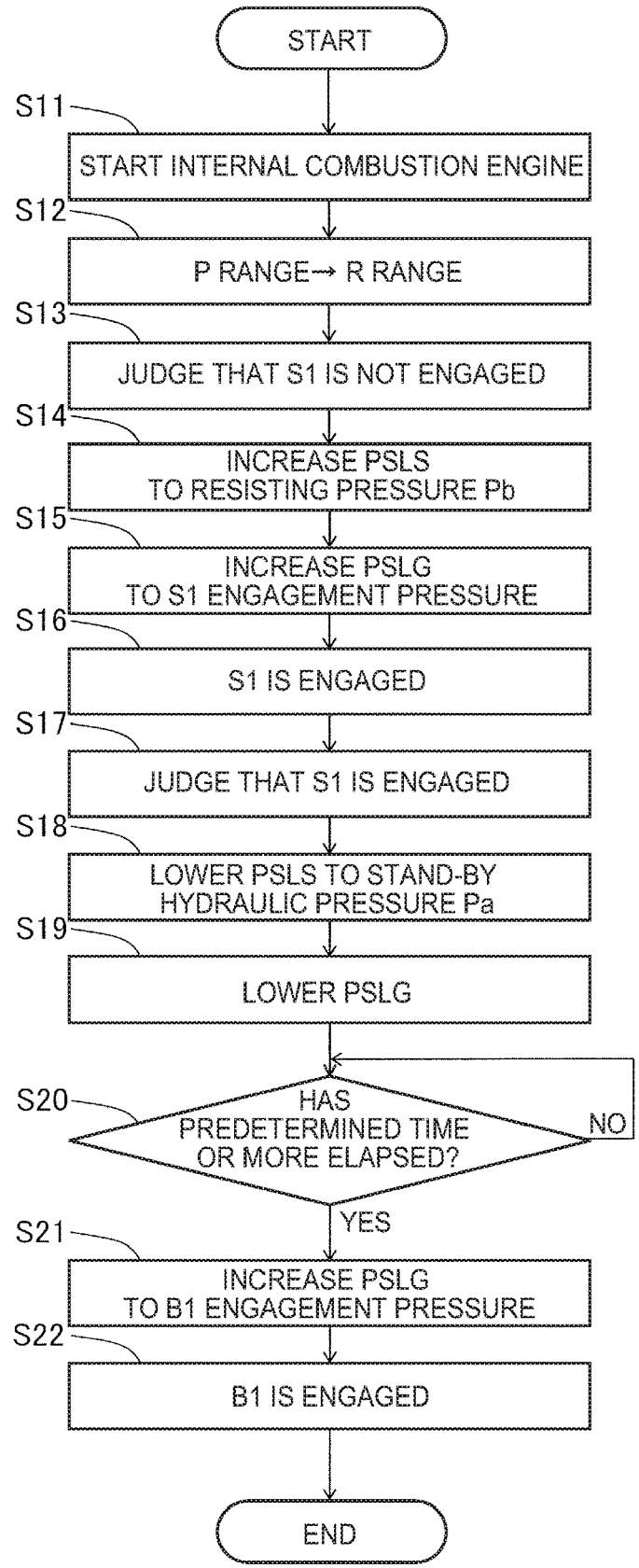
FIG. 5 is a flowchart for a case where a shift change to the reverse range is made before the synchronization mechanism is engaged in the hydraulic control device according to the first embodiment.
Figure 6A:
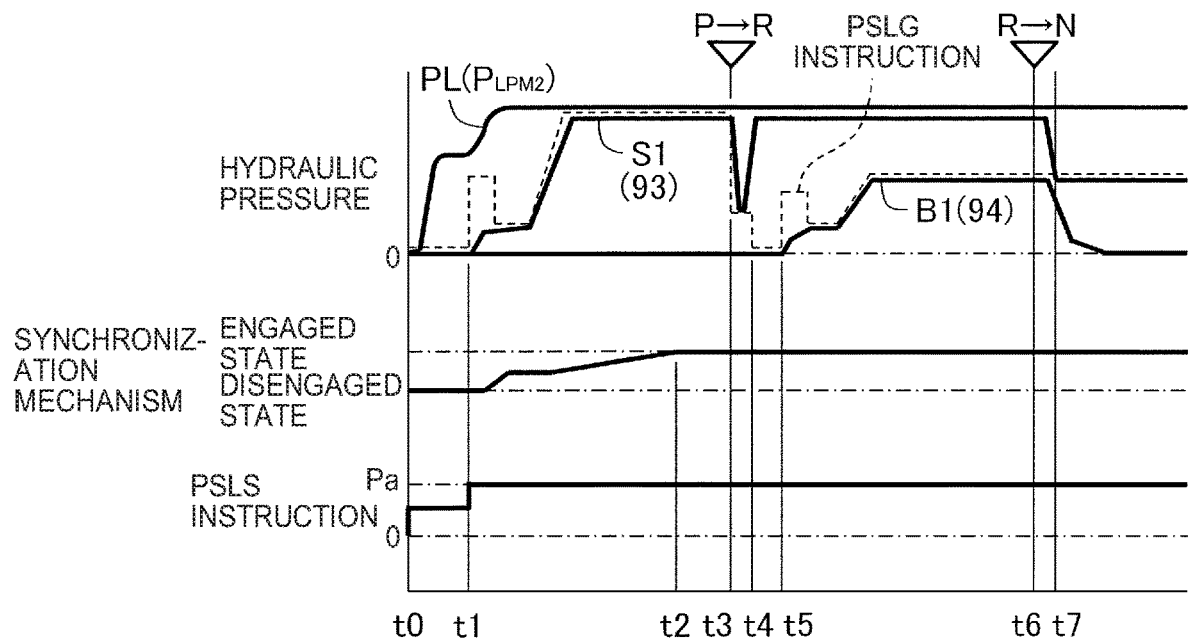
FIG. 6 is a time chart illustrating operation of the hydraulic control device according to the first embodiment, in which FIG. 6A corresponds to the case where a shift change to the reverse range is made after the synchronization mechanism is engaged and FIG. 6B corresponds to the case where a shift change to the reverse range is made before the synchronization mechanism is engaged.
Figure 6B:
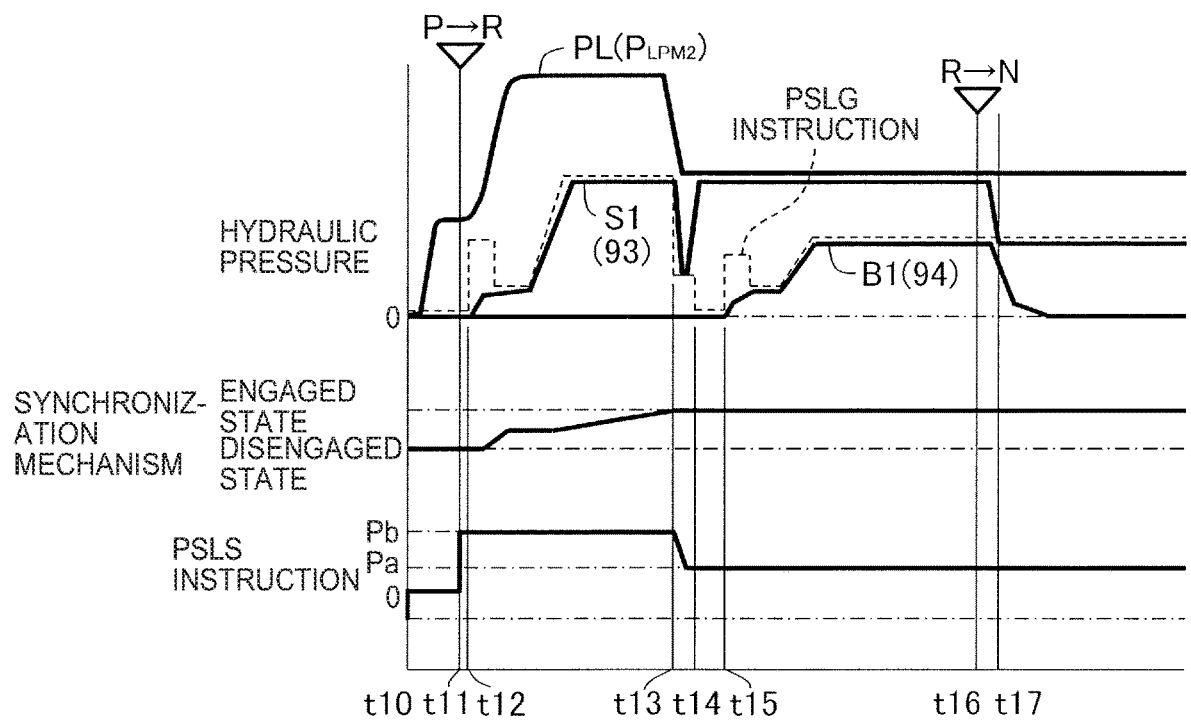

Next, operation of the hydraulic control device 12 for the automatic transmission 10 will be described with reference to the flowcharts illustrated in FIGS. 4 and 5 and the time charts illustrated in FIGS. 6A and 6B. Here, a case (FIGS. 4 and 6A) where garage control is executed with the shift position switched from the P range to the R range after the synchronization mechanism S1 is engaged with a predetermined time elapsed since the start of the internal combustion engine and a case (FIGS. 5 and 6B) where garage control is executed with the shift position switched from the P range to the R range before the synchronization mechanism S1 is engaged with a predetermined time not elapsed will be described. In FIGS. 6A and 6B, a PSLS instruction means an instruction value that the ECU 11 outputs to the linear solenoid valve SLS in order to supply the secondary control pressure PSLS, and is slightly different from the actual secondary control pressure PSLS.

First, the case where garage control is executed with the shift position switched from the P range to the R range after the synchronization mechanism S1 is engaged with a predetermined time elapsed since the start of the internal combustion engine will be described. As illustrated in FIG. 4, the driver starts the internal combustion engine (step S1; t0 in FIG. 6A). Consequently, the line pressure PL and the modulator pressure $P_{LPM2}$ are raised abruptly. At this time, the shift position is the P range, neither of the forward range pressure PD and the reverse range pressure PR is output, and the switching valve 27 is in the non-reverse state. Consequently, the synchronization mechanism S1 can be engaged using the engagement pressure PSLG, and the first brake B1 is in the drained state.

The ECU 11 controls the linear solenoid valve SLG so as to start increasing the engagement pressure PSLG to an engagement pressure at which the synchronization mechanism S1 is engaged, and supplies the engagement pressure PSLG to the hydraulic servo 93 for the synchronization mechanism S1 (step S2; t1 in FIG. 6A). Consequently, the synchronization mechanism S1 gradually transitions to the engaged state. In addition, the ECU 11 controls the secondary linear solenoid valve SLS so as to increase the secondary control pressure PSLS to a stand-by hydraulic pressure Pa (step S3). Here, the stand-by hydraulic pressure Pa is sufficiently low compared to the reverse range pressure PR, and does not affect switching of the spool 27p of the switching valve 27 due to the reverse range pressure PR. The synchronization mechanism S1 transitions toward the engaged state to reach the engaged state (step S4; t2 in FIG. 6A).

Here, the driver operates the shift lever 13 to switch the shift position from the P range to the R range to execute garage control (step S5; t3 in FIG. 6A). The ECU 11 determines on the basis of the result of detection by the shift position detection section 14 that the shift position has been switched to the R range. Next, upon obtaining the determination, the ECU 11 judges whether or not the synchronization mechanism S1 is in the engaged state. The judgment is made on the basis of the result of determination by the synchronization detection section 15. Here, the synchronization mechanism S1 has already been engaged, and thus the ECU 11 judges that the synchronization mechanism S1 is in the engaged state (step S6). Upon judging that the synchronization mechanism S1 is in the engaged state, the ECU 11 controls the linear solenoid valve SLG so as to start lowering the engagement pressure PSLG to about 0 (step S7).

With the shift position switched to the R range, meanwhile, the reverse range pressure PR is output from the manual valve 21 to be supplied to the first working oil chamber 27a of the switching valve 27, and the switching valve 27 starts being switched to the reverse state (t3 in FIG. 6A). The switching valve 27 reaches the reverse state after the lapse of a predetermined time (t4 in FIG. 6A). The switching of the switching valve 27 stops the supply of the engagement pressure PSLG to the hydraulic servo 93 for the synchronization mechanism S1, and enables supply of the modulator pressure $P_{LPM2}$ to the hydraulic servo 93. In addition, the switching of the switching valve 27 enables supply of the engagement pressure PSLG to the hydraulic servo 94 for the first brake B1. Consequently, utilization of the modulator pressure $P_{LPM2}$, which is the source pressure, as the engagement pressure, besides the engagement pressure PSLG which is supplied from the linear solenoid valve SLG, allows supply of two engagement pressures for actuating the synchronization mechanism S1 and the first brake B1 concurrently without installing two linear solenoid valves.

The ECU 11 measures the time elapsed since the shift position is switched to the R range using a timer, and judges whether or not the elapsed time is equal to or more than a predetermined time (step S8). The predetermined time here is set to be longer than the time since the shift position is switched to the R range until the switching valve 27 is switched to the reverse state. In the case where it is judged that the elapsed time is equal to or more than the predetermined time, the ECU 11 considers that the switching valve 27 has already been switched to the reverse state, and controls the linear solenoid valve SLG so as to start increasing the engagement pressure PSLG to an engagement pressure at which the first brake B1 is engaged, and supplies the engagement pressure PSLG to the hydraulic servo 94 for the first brake B1 (step S9; t5 in FIG. 6A). Here, the engagement pressure PSLG has once been lowered to about 0 (t4 to t5 in FIG. 6A). Thus, it is possible to suppress abrupt supply of high-pressure oil to the hydraulic servo 94, and to achieve smooth engagement of the first brake B1. In this way, the first brake B1 gradually transitions to the engaged state, and transitions to reach the engaged state (step S10).

In addition, the driver operates the shift lever 13 to switch the shift position from the R range to the N range, for example, to execute garage control (t6 in FIG. 6A). Consequently, neither of the forward range pressure PD and the reverse range pressure PR is output from the manual valve 21, and the switching valve 27 starts being switched to the non-reverse state. The switching valve 27 reaches the non-reverse state after the lapse of a predetermined time (t7 in FIG. 6A). The switching of the switching valve 27 stops the supply of the modulator pressure $P_{LPM2}$ to the hydraulic servo 93 for the synchronization mechanism S1, and enables supply of the engagement pressure PSLG to the hydraulic servo 93. In addition, the switching of the switching valve 27 brings the hydraulic servo 94 for the first brake B1 into the drained state.

Next, the case where garage control is executed with the shift position switched from the P range to the R range before the synchronization mechanism S1 is engaged with a predetermined time not elapsed since the start of the internal combustion engine will be described. The description also covers a case where the shift position is switched from the P range to the R range before the synchronization mechanism S1 is engaged for any reason, even after the lapse of a predetermined time. As illustrated in FIG. 5, the driver starts the internal combustion engine (step S11; t10 in FIG. 6B). Consequently, the line pressure PL and the modulator pressure $P_{LPM2}$ are raised abruptly. At this time, the shift position is the P range, neither of the forward range pressure PD and the reverse range pressure PR is output, and the switching valve 27 is in the non-reverse state. Consequently, the synchronization mechanism S1 can be engaged using the engagement pressure PSLG, and the first brake B1 is in the drained state.

Here, the driver operates the shift lever 13 before the synchronization mechanism S1 is engaged, to switch the shift position from the P range to the R range to execute garage control (step S12; t11 in FIG. 6B). The ECU 11 determines on the basis of the result of detection by the shift position detection section 14 that the shift position has been switched to the R range. Next, upon obtaining the determination, the ECU 11 judges whether or not the synchronization mechanism S1 is in the engaged state. Here, the synchronization mechanism S1 is not engaged yet, and thus the ECU 11 judges that the synchronization mechanism S1 is in the non-engaged state (step S13). Upon judging that the synchronization mechanism S1 is in the non-engaged state, the ECU 11 controls the secondary linear solenoid valve SLS so as to increase the secondary control pressure PSLS to a resisting pressure Pb and supply the resisting pressure Pb to the second working oil chamber 27b of the switching valve 27 (step S14). The line pressure PL and the modulator pressure $P_{LPM2}$ are raised by increasing the secondary control pressure PSLS to the resisting pressure Pb.

Slightly after the secondary control pressure PSLS is increased, the ECU 11 controls the linear solenoid valve SLG so as to start increasing the engagement pressure PSLG to an engagement pressure at which the synchronization mechanism S1 is engaged, and supplies the engagement pressure PSLG to the hydraulic servo 93 for the synchronization mechanism S1 (step S15; t12 in FIG. 6B). Consequently, the synchronization mechanism S1 gradually transitions to the engaged state, and transitions to reach the engaged state (step S16; t13 in FIG. 6B).

With the shift position switched to the R range, meanwhile, the reverse range pressure PR is output from the manual valve 21 to be supplied to the first working oil chamber 27a of the switching valve 27, and the switching valve 27 is urged to be switched to the reverse state. In contrast, the secondary control pressure PSLS has been supplied to the second working oil chamber 27b of the switching valve 27 as the resisting pressure, and thus the spool 27p of the switching valve 27 is not movable but maintained in the non-reverse state.

The ECU 11 is always judging whether or not the synchronization mechanism S1 is in the engaged state, and judges that the synchronization mechanism S1 is engaged and in the engaged state (step S17). Upon judging that the synchronization mechanism S1 is in the engaged state, the ECU 11 controls the secondary linear solenoid valve SLS so as to lower the secondary control pressure PSLS to the stand-by hydraulic pressure Pa (step S18). Consequently, the resisting pressure due to the secondary control pressure PSLS which has been supplied to the second working oil chamber 27b of the switching valve 27 is lowered, and thus the switching valve 27 starts being switched to the reverse state by the reverse range pressure PR (t13 in FIG. 6B), and the switching valve 27 reaches the reverse state after the lapse of a predetermined time (t14 in FIG. 6B). As in the case of FIG. 6A, the switching of the switching valve 27 stops the supply of the engagement pressure PSLG to the hydraulic servo 93 for the synchronization mechanism S1, and enables supply of the modulator pressure $P_{LPM2}$ to the hydraulic servo 93. In addition, the switching of the switching valve 27 enables supply of the engagement pressure PSLG to the hydraulic servo 94 for the first brake B1. Consequently, utilization of the modulator pressure $P_{LPM2}$, which is the source pressure, as the engagement pressure, besides the engagement pressure PSLG which is supplied from the linear solenoid valve SLG, allows supply of two engagement pressures for actuating the synchronization mechanism S1 and the first brake B1 concurrently without installing two linear solenoid valves.

Upon judging that the synchronization mechanism S1 is in the engaged state, further, the ECU 11 controls the linear solenoid valve SLG so as to start lowering the engagement pressure PSLG to about 0 (step S19).

The ECU 11 measures the time elapsed since an instruction to lower the secondary control pressure PSLS (step S18) is issued using a timer, and judges whether or not the elapsed time is equal to or more than a predetermined time (step S20). The predetermined time here is set to be longer than the time since the instruction to lower the secondary control pressure PSLS is issued until the switching valve 27 is switched to the reverse state. In the case where it is judged that the elapsed time is equal to or more than the predetermined time, the ECU 11 considers that the switching valve 27 has already been switched to the reverse state, and controls the linear solenoid valve SLG so as to start increasing the engagement pressure PSLG to an engagement pressure at which the first brake B1 is engaged, and supplies the engagement pressure PSLG to the hydraulic servo 94 for the first brake B1 (step S21; t15 in FIG. 6B). The first brake B1 gradually transitions to the engaged state, and transitions to reach the engaged state (step S22).

In addition, as in FIG. 6A, the driver operates the shift lever 13 to switch the shift position from the R range to the N range, for example, to execute garage control (t16 in FIG. 6B). Consequently, neither of the forward range pressure PL) and the reverse range pressure PR is output from the manual valve 21, and the switching valve 27 starts being switched to the non-reverse state. The switching valve 27 reaches the non-reverse state after the lapse of a predetermined time (t17 in FIG. 6B). The switching of the switching valve 27 stops the supply of the modulator pressure $P_{LPM2}$ to the hydraulic servo 93 for the synchronization mechanism S1, and enables supply of the engagement pressure PSLG to the hydraulic servo 93. In addition, the switching of the switching valve 27 brings the hydraulic servo 94 for the first brake B1 into the drained state.

As has been described above, the hydraulic control device 12 for the automatic transmission 10 according to the embodiment includes the switching valve 27 which is capable of supplying the engagement pressure PSLG, which is supplied from the linear solenoid valve SLG, switchably to one of the synchronization mechanism S1 and the first brake B1. Thus, the linear solenoid valve SLG can be commonly used for the synchronization mechanism S1 and the first brake B1 as the source of supply of the engagement pressure. Consequently, the number of solenoid valves can be reduced compared to the case where individual solenoid valves are used for the synchronization mechanism S1 and the first brake B1, which can reduce the size and the weight of the hydraulic control device 12 which includes the valve body etc.

In the hydraulic control device 12 for the automatic transmission 10 according to the embodiment, in addition, the forward/reverse switching device 3 includes the first clutch C1 which forms a path for transferring rotation in the forward direction of the vehicle 1 when the first clutch C1 is engaged, and the first brake B1 which forms a path for transferring rotation in the reverse direction of the vehicle 1 when the first brake B1 is engaged; and the engagement element is the first brake B1.

Therefore, with the hydraulic control device 12 for the automatic transmission 10 according to the embodiment, both the synchronization mechanism S1 and the first brake B1 are engaged in the non-continuously-variable mode in the reverse range (see FIG. 2). Even in such a case, the synchronization mechanism S1 and the first brake B1 can be engaged concurrently.

In the hydraulic control device 12 for the automatic transmission 10 according to the embodiment, in addition, the synchronization mechanism S1 includes the urging spring 59 which maintains the synchronization mechanism S1 in the engaged state when the engagement pressure is supplied, and which switches the synchronization mechanism S1 to the disengaged state when the engagement pressure is not supplied. Therefore, the synchronization mechanism S1 is brought into the disengaged state when the internal combustion engine is stopped, and thus the vehicle 1 can be towed easily, for example, compared to a case where the synchronization mechanism S1 is in the engaged state.

In addition, the hydraulic control device 12 for the automatic transmission 10 according to the embodiment includes the line pressure modulator valve 20 which generates the modulator pressure $P_{LPM2}$, and the manual valve 21 which is capable of supplying the reverse range pressure PR. The switching valve 27 is switchable in accordance with the reverse range pressure PR, and is switchable to the non-reverse state, in which the engagement pressure PSLG which is supplied from the linear solenoid valve SLG is supplied to the synchronization mechanism S1 and a hydraulic pressure in the first brake B1 is drained, in the case where the reverse range pressure PR is not supplied, and to the reverse state, in which the engagement pressure PSLG which is supplied from the linear solenoid valve SLG is supplied to the first brake B1 and the modulator pressure $P_{LPM2}$ is supplied to the synchronization mechanism S1 as the engagement pressure, in the case where the reverse range pressure PR is supplied.

Here, for the hydraulic control device 12 for the automatic transmission 10 which uses an engagement element such as the synchronization mechanism S1 of this type, it has conventionally been desired to commonly use a linear solenoid valve to supply engagement pressures. However, the synchronization mechanism S1 operates concurrently with a different engagement element (see FIG. 2), and thus it has been difficult to commonly use a linear solenoid valve that supplies an engagement pressure to the synchronization mechanism S1 with a linear solenoid valve that supplies an engagement pressure to the different engagement element. With the hydraulic control device 12 for the automatic transmission 10 according to the embodiment, in contrast, in the case where the synchronization mechanism S1 and the first brake B1 are engaged concurrently, the engagement pressure PSLG from the linear solenoid valve SLG is supplied to the first brake B1 and the modulator pressure $P_{LPM2}$ is supplied to the synchronization mechanism S1 to engage both the first brake B1 and the synchronization mechanism S1. That is, the synchronization mechanism S1 and the first brake B1 are engaged concurrently by switching the destination of supply of the engagement pressure PSLG from one linear solenoid valve SLG in accordance with the timing, and using the modulator pressure $P_{LPM2}$ which is supplied at all times during operation of the internal combustion engine.

In the hydraulic control device 12 for the automatic transmission 10 according to the embodiment, in addition, the signal pressure supply section (i.e., signal pressure supplier) is the manual valve 21 which supplies the reverse range pressure PR which is output when the travel range is the reverse range; and the signal pressure is the reverse range pressure PR. Therefore, the presence or absence of the supply of the engagement pressure PSLG to the first brake B1 can be switched by switching the switching valve 27 in accordance with whether or not the travel range is the reverse range. That is, determination whether or not the travel range is the reverse range can be caused to coincide, in timing, with switching of the presence or absence of the supply of the engagement pressure PSLG to the first brake B1, which can simplify the circuit configuration of the hydraulic control device 12.

In addition, the hydraulic control device 12 for the automatic transmission 10 according to the embodiment includes the synchronization detection section 15 which detects that the synchronization mechanism S1 is in the engaged state, the shift position detection section 14 which detects that the travel range is the reverse range, and the secondary linear solenoid valve SLS which is capable of supplying the secondary control pressure PSLS which maintains the switching valve 27 in the non-reverse state against the reverse range pressure PR. The secondary linear solenoid valve SLS controls the secondary control pressure PSLS so as to bring the switching valve 27 into the reverse state in the case where the synchronization detection section 15 detects that the synchronization mechanism S1 is in the engaged state and the shift position detection section 14 detects that the travel range is the reverse range.

Therefore, with the hydraulic control device 12 for the automatic transmission 10 according to the embodiment, the ECU 11 controls the secondary linear solenoid valve SLS so as to lower the secondary control pressure PSLS (see step S18 in FIG. 5 and t13 in FIG. 6B) and switch the switching valve 27 to the reverse state using the reverse range pressure PR in the case where the synchronization detection section 15 detects that the synchronization mechanism S1 is in the engaged state and the shift position detection section 14 detects that the travel range is the reverse range. That is, since the synchronization mechanism S1 is in the engaged state, the engagement pressure PSLG is supplied to the hydraulic servo 93 for the synchronization mechanism S1. Therefore, in such a state, the hydraulic pressure is not varied abruptly even if the switching valve 27 is switched from the non-reverse state to the reverse state to switch the hydraulic pressure to be supplied to the hydraulic servo 93 from the engagement pressure PSLG to the modulator pressure $P_{LPM2}$, which allows the hydraulic pressure to be switched smoothly without incurring abrupt operation of the synchronization mechanism S1.

In addition, the hydraulic control device 12 for the automatic transmission 10 according to the embodiment includes the synchronization detection section 15 which detects that the synchronization mechanism S1 is in the engaged state, the shift position detection section 14 which detects that the travel range is the reverse range, and the secondary linear solenoid valve SLS which is capable of supplying the secondary control pressure PSLS which maintains the switching valve 27 in the non-reverse state against the reverse range pressure PR. The secondary linear solenoid valve SLS controls the secondary control pressure PSLS so as to bring the switching valve 27 into the non-reverse state in the case where the synchronization detection section 15 detects that the synchronization mechanism S1 is not in the engaged state and the shift position detection section 14 detects that the travel range is the reverse range.

Here, in the case where the synchronization mechanism S1 is not in the engaged state, the engagement pressure PSLG is not supplied to the hydraulic servo 93 for the synchronization mechanism S1. Therefore, in such a state, the hydraulic pressure is raised abruptly if the switching valve 27 is switched from the non-reverse state to the reverse state to switch the hydraulic pressure to be supplied to the hydraulic servo 93 to the modulator pressure $P_{LPM2}$, which causes abrupt operation of the synchronization mechanism S1 to hinder smooth switching. With the hydraulic control device 12 for the automatic transmission 10 according to the embodiment, in contrast, the ECU 11 controls the secondary linear solenoid valve SLS so as to increase the secondary control pressure PSLS (see step S14 in FIG. 5 and t11 in FIG. 6B) and switch the switching valve 27 to the non-reverse state, or maintains the switching valve 27 in the non-reverse state, against the reverse range pressure PR in the case where the synchronization detection section 15 detects that the synchronization mechanism S1 is not in the engaged state and the shift position detection section 14 detects that the travel range is the reverse range. Therefore, it is possible to suppress switching of the hydraulic pressure to be supplied to the hydraulic servo 93 to the modulator pressure $P_{LPM2}$, and to prevent abrupt operation of the synchronization mechanism S1.

In the hydraulic control device 12 for the automatic transmission 10 according to the embodiment, in addition, the continuously variable speed change mechanism 4 includes the primary pulley 41 which is supplied with the primary pulley pressure to adjust the speed ratio, and the secondary pulley 42 which is supplied with the secondary pulley pressure to regulate the holding pressure; the second solenoid valve is the secondary linear solenoid valve SLS which regulates the secondary pulley pressure; and the resisting pressure is the secondary control pressure PSLS which is supplied from the secondary linear solenoid valve SLS.

Therefore, with the hydraulic control device 12 for the automatic transmission 10 according to the embodiment, the secondary control pressure PSLS which is supplied from the secondary linear solenoid valve SLS is used as the resisting pressure. Thus, even if the secondary control pressure PSLS is varied during reverse travel, the holding pressure for the belt 43 is merely varied, and the travel itself is not affected significantly. In addition, there is no need to provide a new solenoid valve, and thus an increase in number of components can be suppressed.

In the embodiment discussed above, the secondary control pressure PSLS is applied as the resisting pressure for the reverse range pressure PR which is the signal pressure in the switching valve 27. However, the present disclosure is not limited thereto, and an appropriate hydraulic pressure such as a hydraulic pressure from another solenoid valve, for example, may also be applied.

In the embodiment discussed above, in addition, the reverse range pressure PR is applied as the signal pressure for the switching valve 27. However, the present disclosure is not limited thereto, and the primary control pressure PSLP which is supplied from the primary linear solenoid valve SLP, a hydraulic pressure from another solenoid valve such as an on-off solenoid valve SL3, or the like, for example, may also be applied.

Second Embodiment

Next, a hydraulic control device 12 for an automatic transmission 10 according to a second embodiment will be described with reference to FIGS. 7A and 7B. In the embodiment, the primary control pressure PSLP which is supplied from the primary linear solenoid valve SLP is applied as the signal pressure for the switching valve 27 according to the first embodiment. The configuration other than the signal pressure for the switching valve 27 and the resisting pressure is the same as that according to the first embodiment, and thus the same reference numerals are given to omit detailed description. In FIG. 7B, a PSLP instruction means an instruction value that the ECU 11 outputs to the primary linear solenoid valve SLP in order to supply the primary control pressure PSLP, and is slightly different from the actual primary control pressure PSLP.

Figure 7A:
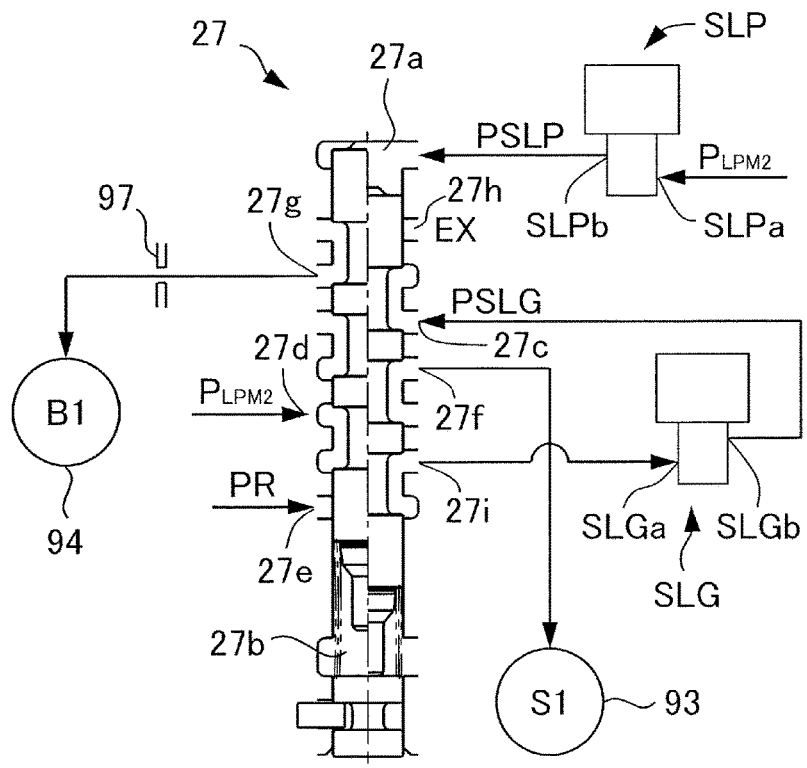
FIG. 7A is a block diagram and FIG. 7B is a time chart for a case where a shift change to a reverse range is made before a synchronization mechanism is engaged.
Figure 7B:
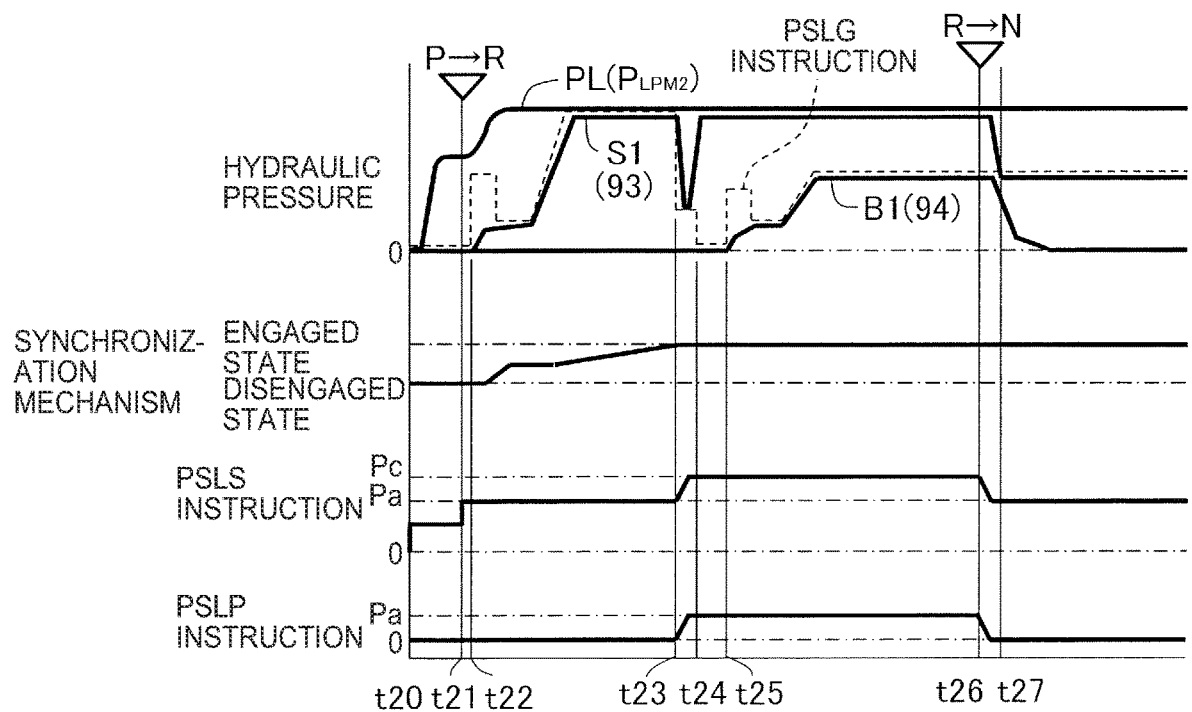

As illustrated in FIG. 7A, the primary linear solenoid valve SLP includes: an input port SLPa to which the modulator pressure $P_{LPM2}$ is input; and an output port SLPb that communicates with the first working oil chamber 27a of the switching valve 27. The primary linear solenoid valve SLP is configured to freely regulate the input modulator pressure $P_{LPM2}$ to generate the primary control pressure PSLP to supply the primary control pressure PSLP from the output port SLPb to the switching valve 27 as a signal pressure. The output port SLPb communicates with a primary pressure control valve (not illustrated). In this case, in addition, the primary control pressure PSLP can be regulated during reverse travel, which can eliminate the need for a resisting pressure.

A case where garage control is executed with the shift position switched from the P range to the R range before the synchronization mechanism S1 is engaged with a predetermined time not elapsed since the start of the internal combustion engine, as in FIG. 6B for the first embodiment, utilizing such a hydraulic control device 12 will be described with a focus on characteristic different portions. When the driver starts the internal combustion engine (t20 in FIG. 7B), the line pressure PL and the modulator pressure $P_{LPM2}$ are raised abruptly. The driver operates the shift lever 13 before the synchronization mechanism S1 is engaged, to switch the shift position from the P range to the R range to execute garage control (t21 in FIG. 7B). Upon judging that the synchronization mechanism S1 is in the non-engaged state, the ECU 11 maintains the primary control pressure PSLP at 0 (t20 to t23 in FIG. 7B).

Upon judging that the synchronization mechanism S1 is in the engaged state, the ECU 11 controls the primary linear solenoid valve SLP so as to increase the primary control pressure PSLP to a signal pressure Pc (t23 to t24 in FIG. 7B). Consequently, the switching valve 27 starts being switched to the reverse state by the primary control pressure PSLP (t23 in FIG. 7B), and the switching valve 27 reaches the reverse state after the lapse of a predetermined time (t24 in FIG. 7B).

In addition, the driver operates the shift lever 13 to switch the shift position from the R range to the N range, for example, to execute garage control (t26 in FIG. 7B). Upon detecting the shift change, the ECU 11 lowers the primary control pressure PSLP to 0 (t26 to t27 in FIG. 7B). Consequently, the switching valve 27 starts being switched to the non-reverse state, and reaches the non-reverse state after the lapse of a predetermined time (t27 in FIG. 7B).

The hydraulic control device 12 for the automatic transmission 10 according to the embodiment also includes the switching valve 27 which is capable of supplying the engagement pressure PSLG, which is supplied from the linear solenoid valve SLG, switchably to one of the synchronization mechanism S1 and the first brake B1. Thus, the linear solenoid valve SLG can be commonly used for the synchronization mechanism S1 and the first brake B1 as the source of supply of the engagement pressure. Consequently, the number of solenoid valves can be reduced compared to a case where individual solenoid valves are used for the synchronization mechanism S1 and the first brake B1, which can reduce the size and the weight of the hydraulic control device 12 which includes the valve body etc.

In the hydraulic control device 12 for the automatic transmission 10 according to the embodiment, in addition, the continuously variable speed change mechanism 4 includes the primary pulley 41 which is supplied with the primary pulley pressure to adjust the speed ratio, and the secondary pulley 42 which is supplied with the secondary pulley pressure to regulate the holding pressure. The signal pressure supply section is the primary linear solenoid valve SLP which regulates the primary pulley pressure, and the signal pressure is the primary control pressure PSLP which is supplied from the primary linear solenoid valve SLP. The continuously variable speed change mechanism 4 may be upshifted by raising the primary control pressure PSLP to switch the switching valve 27. Thus, the secondary control pressure PSLS is preferably also raised at the same time to suppress an upshift.

Therefore, with the hydraulic control device 12 for the automatic transmission 10 according to the embodiment, the primary control pressure PSLP can be regulated during reverse travel. Thus, there is no need for a resisting pressure for the switching valve 27, which can simplify the hydraulic circuit.

Third Embodiment

Next, a hydraulic control device 12 for an automatic transmission 10 according to a third embodiment will be described with reference to FIGS. 8A and 8B. In the embodiment, a signal pressure PSL3 which is supplied from a dedicated on-off solenoid valve SL3 is applied for the signal pressure for the switching valve 27 according to the first embodiment. The configuration other than the signal pressure for the switching valve 27 and the resisting pressure is the same as that according to the first embodiment, and thus the same reference numerals are given to omit detailed description. In FIG. 8B, a PSL3 instruction means an instruction value that the ECU 11 outputs to the on-off solenoid valve SL3 in order to supply the signal pressure PSL3, and is slightly different from the actual signal pressure PSL3.

Figure 8A:
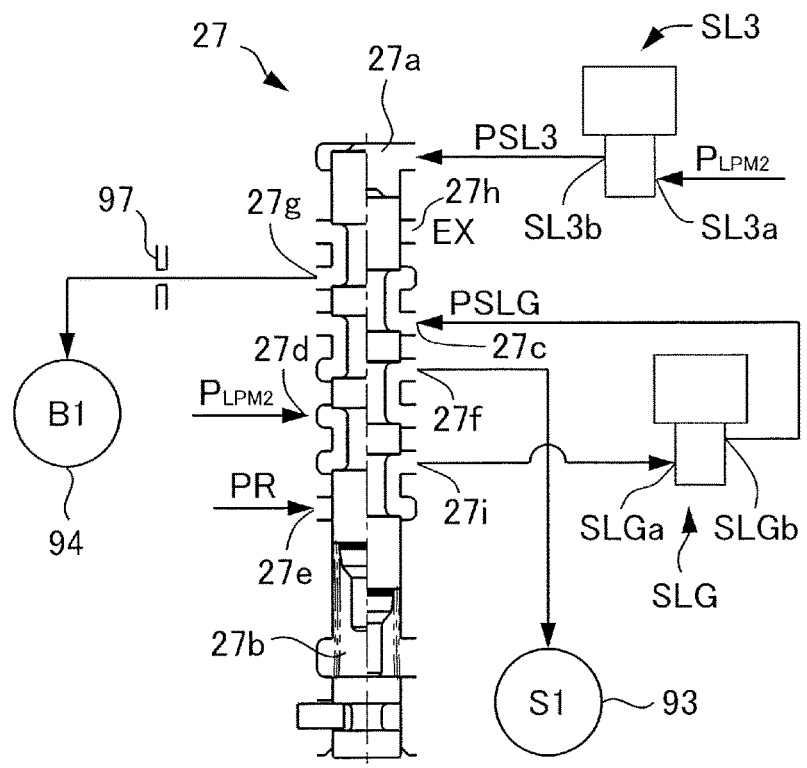
FIG. 8A is a block diagram and FIG. 8B is a time chart for a case where a shift change to a reverse range is made before a synchronization mechanism is engaged.
Figure 8B:
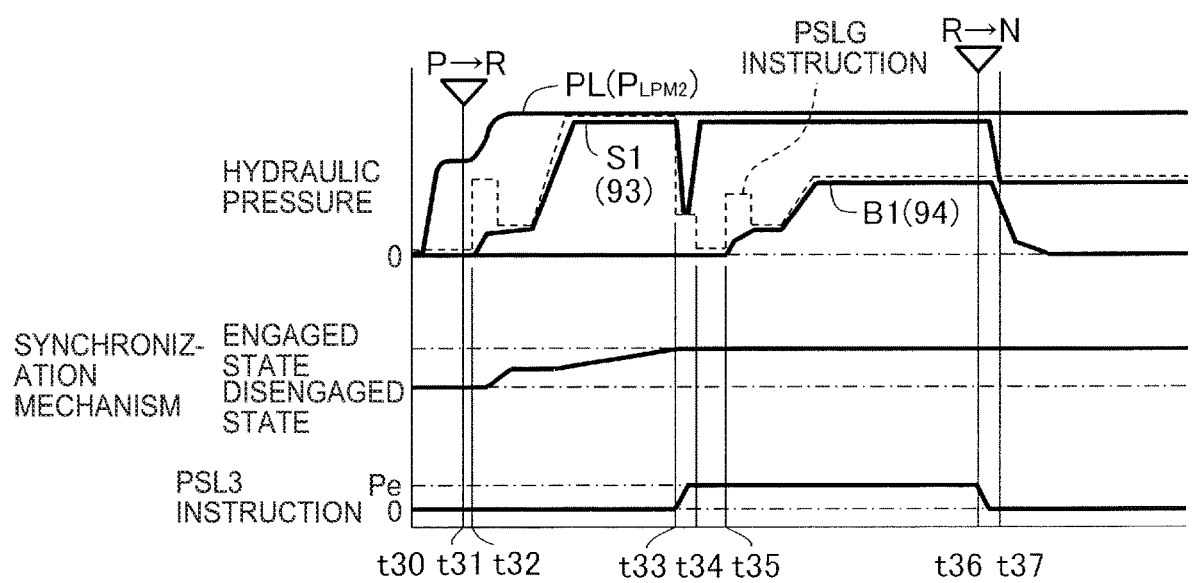

As illustrated in FIG. 8A, the on-off solenoid valve SL3 includes: an input port SL3a to which the modulator pressure $P_{LPM2}$ is input; and an output port SL3b that communicates with the first working oil chamber 27a of the switching valve 27. The on-off solenoid valve SL3 is configured to freely regulate the input modulator pressure $P_{LPM2}$ to generate the signal pressure PSL3 to supply the signal pressure PSLS from the output port SL3b to the switching valve 27. In this case, in addition, the signal pressure PSLS can be regulated during reverse travel, which can eliminate the need for a resisting pressure.

A case where garage control is executed with the shift position switched from the P range to the R range before the synchronization mechanism S1 is engaged with a predetermined time not elapsed since the start of the internal combustion engine, as in FIG. 6B for the first embodiment, utilizing such a hydraulic control device 12 will be described with a focus on characteristic different portions. When the driver starts the internal combustion engine (t30 in FIG. 8B), the line pressure PL and the modulator pressure $P_{LPM2}$ are raised abruptly. The driver operates the shift lever 13 before the synchronization mechanism S1 is engaged, to switch the shift position from the P range to the R range to execute garage control (t31 in FIG. 8B). Upon judging that the synchronization mechanism S1 is in the non-engaged state, the ECU 11 maintains the signal pressure PSL3 at 0 (t30 to t33 in FIG. 8B).

Upon judging that the synchronization mechanism S1 is in the engaged state, the ECU 11 controls the on-off solenoid valve SL3 so as to increase the signal pressure PSL3 to a signal pressure Pe (t33 to t34 in FIG. 8B). Consequently, the switching valve 27 starts being switched to the reverse state by the signal pressure PSL3 (t33 in FIG. 8B), and the switching valve 27 reaches the reverse state after the lapse of a predetermined time (t34 in FIG. 8B).

In addition, the driver operates the shift lever 13 to switch the shift position from the R range to the N range, for example, to execute garage control (t36 in FIG. 8B). Upon detecting the shift change, the ECU 11 lowers the signal pressure PSL3 to 0 (t36 to t37 in FIG. 8B). Consequently, the switching valve 27 starts being switched to the non-reverse state, and reaches the non-reverse state after the lapse of a predetermined time (t37 in FIG. 8B).

The hydraulic control device 12 for the automatic transmission 10 according to the embodiment also includes the switching valve 27 which is capable of supplying the engagement pressure PSLG, which is supplied from the linear solenoid valve SLG, switchably to one of the synchronization mechanism S1 and the first brake B1. Thus, the linear solenoid valve SLG can be commonly used for the synchronization mechanism S1 and the first brake B1 as the source of supply of the engagement pressure. Consequently, the number of solenoid valves can be reduced compared to the case where individual solenoid valves are used for the synchronization mechanism S1 and the first brake B1, which can reduce the size and the weight of the hydraulic control device 12 which includes the valve body etc.

In the hydraulic control device 12 for the automatic transmission 10 according to the embodiment, in addition, the signal pressure supply section is the on-off solenoid valve SL3 which generates the signal pressure PSL3. Therefore, the primary control pressure PSLP can be regulated during reverse travel. Thus, there is no need for a resisting pressure, which can simplify the hydraulic circuit. Moreover, a hydraulic pressure for controlling the continuously variable speed change mechanism 4 is not utilized. Thus, the signal pressure PSL3 and the continuously variable speed change mechanism 4 can be controlled independently, which can simplify the hydraulic circuit and the control.

The hydraulic control device 12 for the automatic transmission 10 according to the second and third embodiments discussed above includes the synchronization detection section 15 which detects that the synchronization mechanism S1 is in the engaged state, and the shift position detection section 14 which detects that the travel range is the reverse range. The signal pressure supply section (the primary linear solenoid valve SLP or the on-off solenoid valve SL3) controls the primary control pressure PSLP or the signal pressure PSL3 so as to bring the switching valve 27 into the reverse state in the case where the synchronization detection section 15 detects that the synchronization mechanism S1 is in the engaged state and the shift position detection section 14 detects that the travel range is the reverse range.

Therefore, with the hydraulic control device 12 for the automatic transmission 10 according to the second and third embodiments, the ECU 11 controls the primary linear solenoid valve SLP or the on-off solenoid valve SL3 so as to increase the primary control pressure PSLP or the signal pressure PSL3 (see t23 in FIG. 7B and t33 in FIG. 8B) and switch the switching valve 27 to the reverse state in the case where the synchronization detection section 15 detects that the synchronization mechanism S1 is in the engaged state and the shift position detection section 14 detects that the travel range is the reverse range. That is, since the synchronization mechanism S1 is in the engaged state, the engagement pressure PSLG is supplied to the hydraulic servo 93 for the synchronization mechanism S1. Therefore, in such a state, the hydraulic pressure is not varied abruptly even if the switching valve 27 is switched from the non-reverse state to the reverse state to switch the hydraulic pressure to be supplied to the hydraulic servo 93 from the engagement pressure PSLG to the modulator pressure $P_{LPM2}$, which allows the hydraulic pressure to be switched smoothly without incurring abrupt operation of the synchronization mechanism S1.

In addition, the hydraulic control device 12 for the automatic transmission 10 according to the second and third embodiments discussed above includes the synchronization detection section 15 which detects that the synchronization mechanism S1 is in the engaged state, and the shift position detection section 14 which detects that the travel range is the reverse range. The signal pressure supply section (the primary linear solenoid valve SLP or the on-off solenoid valve SL3) controls the primary control pressure PSLP or the signal pressure PSL3 so as to bring the switching valve 27 into the non-reverse state in the case where the synchronization detection section 15 detects that the synchronization mechanism S1 is not in the engaged state and the shift position detection section 14 detects that the travel range is the reverse range.

Therefore, with the hydraulic control device 12 for the automatic transmission 10 according to the second and third embodiments, the ECU 11 controls the primary linear solenoid valve SLP or the on-off solenoid valve SL3 so as to maintain the primary control pressure PSLP or the signal pressure PSL3 at 0 (see t21 to t23 in FIG. 7B and t31 to t33 in FIG. 8B) and switch the switching valve 27 to the non-reverse state, or maintain the switching valve 27 in the non-reverse state, in the case where the synchronization detection section 15 detects that the synchronization mechanism S1 is not in the engaged state and the shift position detection section 14 detects that the travel range is the reverse range. Therefore, it is possible to suppress switching of the hydraulic pressure to be supplied to the hydraulic servo 93 to the modulator pressure $P_{LPM2}$, and to prevent abrupt operation of the synchronization mechanism S1.

In the first to third embodiments discussed above, the linear solenoid valve SLG is commonly used for the synchronization mechanism S1 and the first brake B1. However, the present disclosure is not limited thereto. That is, an engagement, element commonly used for the synchronization mechanism S1 and the linear solenoid valve SLG may be provided in at least one location in the first power transfer path a1 and the second power transfer path a2. For example, the linear solenoid valve SLG may be commonly used for the synchronization mechanism S1 and the first clutch C1, or the linear solenoid valve SLG may be commonly used for the synchronization mechanism S1 and the second clutch C2.

Fourth Embodiment

Next, a hydraulic control device 112 for an automatic transmission 10 according to a fourth embodiment will be described with reference to FIG. 9. In the embodiment, the linear solenoid valve SLG is commonly used for the synchronization mechanism S1 and the first clutch C1. The configuration of the various valves such as the switching valve 27 and the clutch application control valve 26 is the same as that according to the first embodiment, and thus the same reference numerals are given to omit detailed description.

Figure 9:
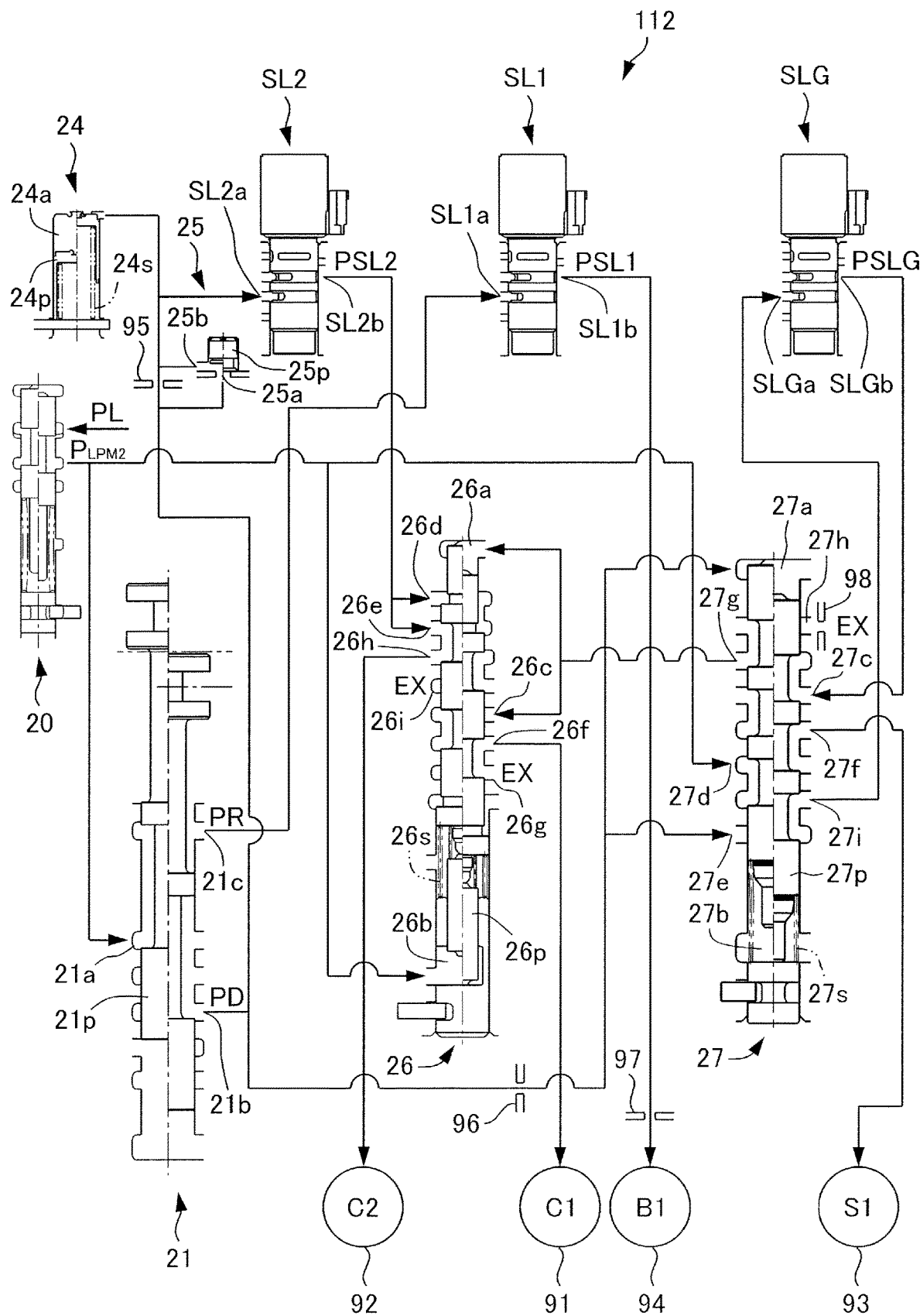
FIG. 9 is a block diagram illustrating a hydraulic control device according to a fourth embodiment.

As illustrated in FIG. 9, the hydraulic control device 112 includes the line pressure modulator valve 20, the manual valve 21, the linear solenoid valve SL1, the linear solenoid valve SL2, the accumulator 24 and the check valve 25 which are connected to the linear solenoid valve SL2, the clutch application control valve 26, the switching valve 27, the linear solenoid valve SLG, and so forth.

The linear solenoid valve SL1 includes: the input port SL1a to which the reverse range pressure PR is input; and the output port SL1b which communicates with the hydraulic servo 94. The linear solenoid valve SL1 is configured to freely regulate the input reverse range pressure PR, to generate an engagement pressure PSL1 to be supplied to the hydraulic servo 94, and to supply the engagement pressure PSL1 from the output port SL1b. An orifice 97 is disposed in an oil passage that allows communication between the output port SL1b and the hydraulic servo 94. Consequently, the draining speed of the hydraulic servo 94 can be reduced.

The clutch application control valve 26 includes: the first input port 26c which communicates with the first working oil chamber 26a and to which the engagement pressure PSLG can be input from the second output port 27g of the switching valve 27; and the second input port 26d and the third input port 26e to which the engagement pressure PSL2 is input. The clutch application control valve 26 also includes: the first output port 26f which communicates with the hydraulic servo 91; the drain port 26g; the second output port 26h which communicates with the hydraulic servo 92; and the drain port 26i.

In the case where the engagement pressure PSLG is input and the engagement pressure PSL2 is not input, the engagement pressure PSLG is supplied to the hydraulic servo 91 with the clutch application control valve 26 kept in the normal state. In the case where the engagement pressure PSL2 is input and the engagement pressure PSLG is not input, meanwhile, the engagement pressure PSL2 is supplied to the hydraulic servo 92 with the clutch application control valve 26 kept in the normal state. In the case where both the engagement pressure PSLG and the engagement pressure PSL2 are input, further, the clutch application control valve 26 is switched to the tie-up prevention state, and a hydraulic pressure is drained from both the hydraulic servos 91 and 92. However, the present disclosure is not limited thereto, and a hydraulic pressure may be drained from one of the hydraulic servos 91 and 92, and the other may be engaged. Consequently, it is possible to prevent the hydraulic servo 91 and the hydraulic servo 92 from being supplied with an engagement pressure concurrently, and thus to prevent occurrence of tie-up due to concurrent engagement of the first clutch C1 and the second clutch C2.

The switching valve 27 includes: the spool 27p which can be switched between the left-half position (non-forward state) and the right-half position (forward state); and the spring 27s which is constituted of a compression coil spring that urges the spool 27p toward the left-half position. The switching valve 27 includes: the first working oil chamber 27a to which the forward range pressure (signal pressure) PD is input in the direction in which the spool 27p is pressed toward the right-half position; and the second working oil chamber 27b which is opened. The switching valve 27 also includes: the first input port 27c to which the engagement pressure PSLG is input; the second input port 27d to which the modulator pressure $P_{LPM2}$ is input; and the third input port 27e to which the forward range pressure PD is input. The switching valve 27 further includes: the first output port 27f which communicates with the hydraulic servo 93; the second output port 27g which communicates with the first working oil chamber 26a and the first input port 26c of the clutch application control valve 26; the drain port 27h; and the third output port 27i which communicates with the input port SLGa of the linear solenoid valve SLG.

An orifice 96 is disposed in an oil passage that allows communication between the first working oil chamber 27a and the third input port 27e and the output port 21b of the manual valve 21. In addition, an orifice 98 is provided at the drain port 27h.

In the case where the shift position of the manual valve 21 is a range other than the forward range and the forward range pressure PD is not generated, the switching valve 27 is kept in the non-forward state, and the modulator pressure $P_{LPM2}$ passes through the switching valve 27 to be supplied to the linear solenoid valve SLG, the engagement pressure PSLG passes through the switching valve 27 to be supplied to the hydraulic servo 93, and a hydraulic pressure in the hydraulic servo 91 is drained from the drain port 27h via the clutch application control valve 26 and the switching valve 27. Meanwhile, in the case where the shift position is the forward range and the forward range pressure PD is generated, the switching valve 27 is switched to the forward state, and the modulator pressure $P_{LPM2}$ passes through the switching valve 27 to be supplied to the hydraulic servo 93, the forward range pressure PD passes through the switching valve 27 to be supplied to the linear solenoid valve SLG, and the engagement pressure PSLG passes through the switching valve 27 and the clutch application control valve 26 to be supplied to the hydraulic servo 91.

The hydraulic control device 112 for the automatic transmission 10 according to the embodiment includes the switching valve 27 which is capable of supplying the engagement pressure PSLG, which is supplied from the linear solenoid valve SLG, switchably to one of the synchronization mechanism S1 and the first clutch C1. Thus, the linear solenoid valve SLG can be commonly used for the synchronization mechanism S1 and the first clutch C1 as the source of supply of the engagement pressure. Consequently, the number of solenoid valves can be reduced compared to the case where individual solenoid valves are used for the synchronization mechanism S1 and the first clutch C1, which can reduce the size and the weight of the hydraulic control device 112 which includes the valve body etc.

In the hydraulic control device 112 for the automatic transmission 10 according to the embodiment, in addition, the forward/reverse switching device 3 includes the first clutch C1 which forms a path for transferring rotation in the forward direction of the vehicle 1 when the first clutch C1 is engaged, and the first brake B1 which forms a path for transferring rotation in the reverse direction of the vehicle 1 when the first brake B1 is engaged; and the engagement element is the first clutch C1.

Therefore, with the hydraulic control device 112 for the automatic transmission 10 according to the embodiment, both the synchronization mechanism S1 and the first clutch C1 are engaged in the non-continuously-variable mode in the forward range (see FIG. 2). Even in such a case, the synchronization mechanism S1 and the first clutch C1 can be engaged concurrently.

In the hydraulic control device 112 for the automatic transmission 10 illustrated in FIG. 9 and discussed above, the linear solenoid valve SLG is switchably used for the synchronization mechanism S1 and the first clutch C1. However, the present disclosure is not limited thereto. For example, the linear solenoid valve SLG may be switchably used for the synchronization mechanism S1 and the second clutch C2 by replacing the first clutch C1 and the second clutch C2 with each other. In this case, the engagement element is the second clutch C2 which is provided in the second power transfer path a2 and which is brought into the engaged state in the continuously-variable mode to connect the input shaft 2 and the driving shaft 60 to each other through the second power transfer path a2 for rotation transfer.

In this case, the hydraulic control device for an automatic transmission includes the switching valve 27 which is capable of supplying the engagement pressure PSLG, which is supplied from the linear solenoid valve SLG, switchably to one of the synchronization mechanism S1 and the second clutch C2. Thus, the linear solenoid valve SLG can be commonly used for the synchronization mechanism S1 and the second clutch C2 as the source of supply of the engagement pressure.

In the first to fourth embodiments discussed above, the synchronization mechanism S1 has the urging spring 59, and the engaged state is not maintained but the disengaged state is established by not supplying a hydraulic pressure to the hydraulic servo 93. However, the present disclosure is not limited thereto. The synchronization mechanism S1 may be of an on-lock type that has a lock mechanism that can maintain the engaged state even if a hydraulic pressure is no longer supplied after engagement.

In the first to fourth embodiments discussed above, in addition, the linear solenoid valve SLG is a valve that supplies an engagement pressure to the synchronization mechanism S1 and another engagement element. However, the present disclosure is not limited thereto. The linear solenoid valve SLG may be another linear solenoid valve or a solenoid valve that performs duty control.

Fifth Embodiment

Next, a hydraulic control device 212 for an automatic transmission 110 according to a fifth embodiment will be described with reference to FIG. 10. In the first to fourth embodiments discussed above, the automatic transmission 10 has the forward/reverse switching device 3 and the continuously variable speed change mechanism 4. In the embodiment, in contrast, the automatic transmission 110 does not have a forward/reverse switching device or a continuously variable speed change mechanism. The components such as the speed-reduction gear mechanism 5, the output gear portion 6, the counter shaft portion 7, and the differential device 8 are the same as those according to the first embodiment and thus the same reference numerals are given to omit detailed description.

Figure 10:
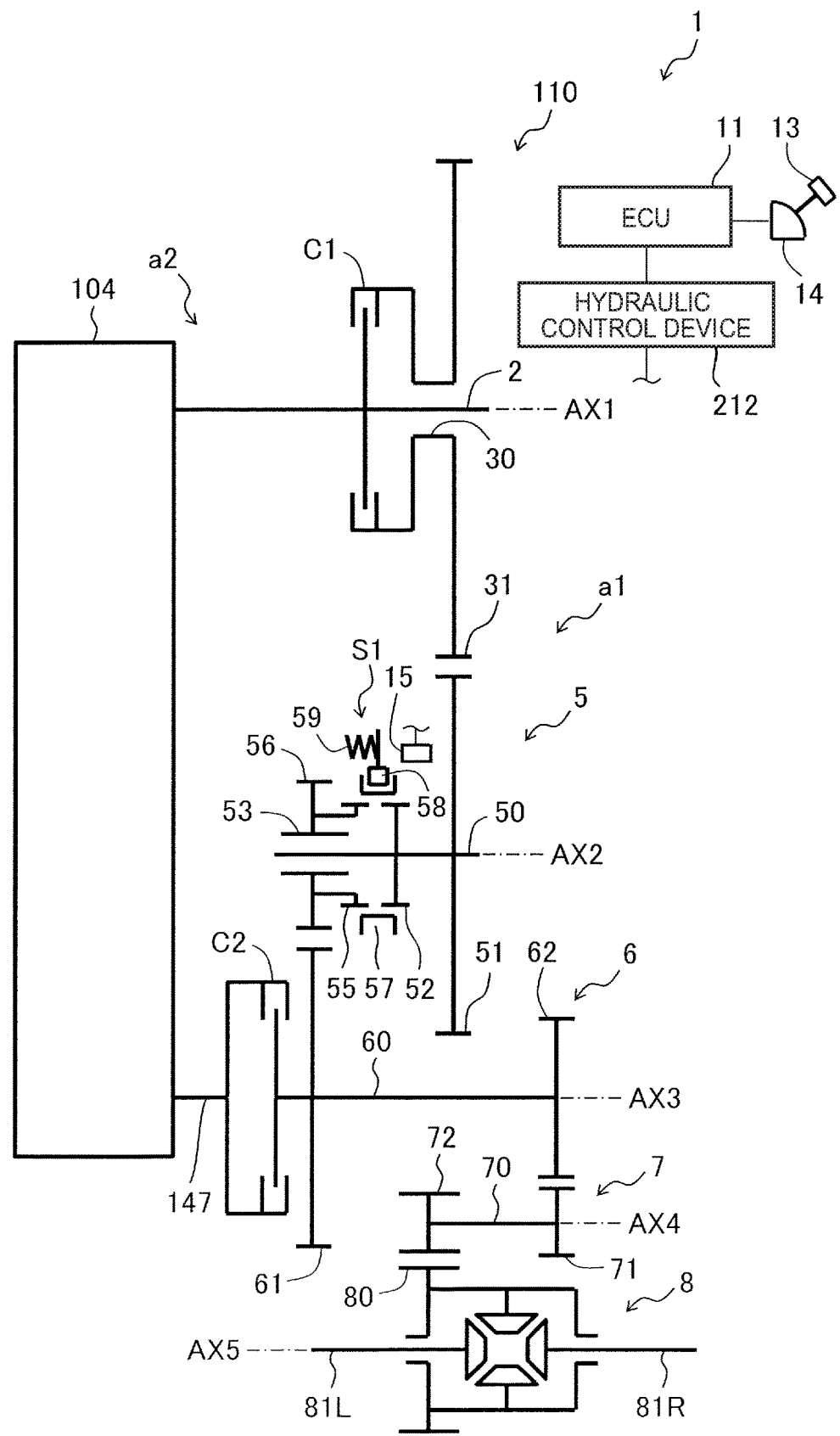
FIG. 10 is a skeleton diagram illustrating an automatic transmission according to a modification of the first embodiment.

As illustrated in FIG. 10, the automatic transmission 110 includes the torque converter (not illustrated), the input shaft 2, a stepped speed change mechanism 104, the speed-reduction gear mechanism 5, the output gear portion 6 which has the driving shaft 60, the counter shaft portion 7, and the differential device 8. In addition, the automatic transmission 110 includes a first power transfer path a1 that couples the input shaft 2 and the driving shaft 60 of the output gear portion 6 to each other via the synchronization mechanism S1, and a second power transfer path a2 that couples the input shaft 2 and the driving shaft 60 to each other at least partially through a path that is different from the first power transfer path a1 and via the stepped speed change mechanism 104. In addition, the automatic transmission 110 includes axes that are parallel to each other, namely a first axis AX1 to a fifth axis AX5.

The input shaft of the automatic transmission 110 which is coupled to the crankshaft, the torque converter, the input shaft 2 of the stepped speed change mechanism 104, and the first clutch (engagement element) C1 are disposed on the first axis AX1. An output shaft 147 of the stepped speed change mechanism 104, the second clutch (engagement element) C2, and the output gear portion 6 are disposed on the third axis AX3.

In this case, the hydraulic control device 212 has a first solenoid valve and a switching valve. The first solenoid valve can supply an engagement, pressure to the synchronization mechanism S1 and the first clutch C1 or the second clutch C2. The switching valve can switchably supply the engagement pressure which is supplied from the first solenoid valve to one of the synchronization mechanism S1 and the first clutch C1 or the second clutch C2.

With the hydraulic control device 212 for the automatic transmission 110, the first solenoid valve can be commonly used as the source of supply of an engagement pressure for the synchronization mechanism S1 and the first clutch C1 or the second clutch C2. Consequently, the number of solenoid valves can be reduced compared to the case where individual solenoid valves are used for the synchronization mechanism S1 and the first clutch C1 or the second clutch C2, which can reduce the size and the weight of the hydraulic control device 212 which includes the valve body etc.

The first to fifth embodiments discussed above include at least the following configuration. Each of the embodiments provides a hydraulic control device (12, 112, 212) for an automatic transmission (10, 110), the hydraulic control device utilized for the automatic transmission including: an input shaft (2) drivably coupled to a drive source of a vehicle (1); a driving shaft (60) drivably coupled to wheels; a synchronization mechanism (S1); and an engagement element (B1, C1, C2) provided at at least one location in a first power transfer path (a1) that couples the input shaft (2) and the driving shaft (60) to each other via the synchronization mechanism (S1) and a second power transfer path (a2) that couples the input shaft (2) and the driving shaft (60) to each other at least partially through a path that is different from the first power transfer path (a1), and switchable between a first mode, in which the synchronization mechanism (S1) is brought into an engaged state to connect the input shaft (2) and the driving shaft (60) to each other through the first power transfer path (a1) for rotation transfer, and a second mode, in which the synchronization mechanism (S1) is brought into a disengaged state to connect the input shaft (2) and the driving shaft (60) to each other through the second power transfer path (a2) for rotation transfer; and supplying and discharging an engagement pressure (PSLG) to and from the synchronization mechanism (S1) and the engagement element (B1, C1, C2), the hydraulic control device (12, 112, 212) including: a first solenoid valve (SLG) capable of supplying the engagement pressure (PSLG); and a switching valve (27) capable of supplying the engagement pressure (PSLG), which is supplied from the first solenoid valve (SLG), switchably to one of the synchronization mechanism (S1) and the engagement element (B1, C1, C2). With the configuration, the hydraulic control device includes the switching valve (27) which is capable of supplying the engagement pressure (PSLG), which is supplied from the first solenoid valve (SLG), switchably to one of the synchronization mechanism (S1) and the engagement element (B1, C1, C2). Thus, the first solenoid valve (SLG) can be commonly used for the synchronization mechanism (S1) and the engagement element (B1, C1, C2) as the source of supply of the engagement pressure (PSLG). Consequently, the number of solenoid valves can be reduced compared to the case where individual solenoid valves are used for the synchronization mechanism (S1) and the engagement element (B1, C1, C2), which can reduce the size and the weight of the valve body etc.

The first to fourth embodiments provide the hydraulic control device (12, 112) for the automatic transmission (10), including: a forward/reverse switching device (3) configured for transfer with a rotational direction switched in accordance with a travel direction of the vehicle (1); and a continuously variable speed change mechanism (4) capable of continuously changing a speed ratio, in which: the first power transfer path (a1) couples the input shaft (2) and the driving shaft (60) to each other via the forward/reverse switching device (3); and the second power transfer path (a2) couples the input shaft (2) and the driving shaft (60) to each other via the continuously variable speed change mechanism (4). With the configuration, the automatic transmission (10) which has the continuously variable speed change mechanism (4) can establish, the continuously-variable mode and the non-continuously-variable mode in the forward range, and the non-continuously-variable mode in the reverse range.

In the hydraulic control device (12, 112) for the automatic transmission (10) according to the first to fourth embodiments, in addition, the forward/reverse switching device (3) includes a forward engagement element (C1) that forms a path through which rotation in a forward direction of the vehicle (1) is transferred when the forward engagement element (C1) is engaged, and a reverse engagement element (B1) that forms a path through which rotation in a reverse direction of the vehicle (1) is transferred when the reverse engagement element (B1) is engaged; and the engagement element (B1, C1, C2) is the reverse engagement element (B1). With the configuration, the synchronization mechanism (S1) and the reverse engagement element (B1) can be engaged concurrently even in the case where both the synchronization mechanism (S1) and the reverse engagement element (B1) are engaged in the reverse range, for example.

In the hydraulic control device (12, 112) for the automatic transmission (10) according to the first to fourth embodiments, in addition, the synchronization mechanism (S1) includes an urging portion (59) that maintains the synchronization mechanism (S1) in the engaged state when the engagement pressure (PSLG) is supplied, and that switches the synchronization mechanism (S1) to the disengaged state when the engagement pressure (PSLG) is not supplied. With the configuration, the synchronization mechanism (S1) is brought into the disengaged state when the drive source is stopped, and thus the vehicle (1) can be towed easily, for example, compared to the case where the synchronization mechanism (S1) is in the engaged state.

The first to fourth embodiments provide the hydraulic control device (12, 112) for the automatic transmission (10), including: a source pressure generation section (20) that generates a source pressure ($P_{LPM2}$); and a signal pressure supply section (21, SLP, SL3) capable of supplying a signal pressure (PR, PSLP, PSL3, PD), in which: the switching valve (27) is switchable in accordance with the signal pressure (PR, PSLP, PSL3, PD), and is switchable to a non-reverse state, in which the engagement pressure (PSLG) which is supplied from the first solenoid valve (SLG) is supplied to the synchronization mechanism (S1) and a hydraulic pressure in the reverse engagement element (B1) is drained, in the case where the signal pressure (PR, PSLP, PSL3, PD) is not supplied, and to a reverse state, in which the engagement pressure (PSLG) which is supplied from the first solenoid valve (SLG) is supplied to the reverse engagement element (B1) and the source pressure ($P_{LPM2}$) is supplied to the synchronization mechanism (S1) as the engagement pressure ($P_{LPM2}$), in the case where the signal pressure (PR, PSLP, PSL3, PD) is supplied. With the configuration, the synchronization mechanism (S1) and the reverse engagement element (B1) are engaged concurrently by switching the destination of supply of the engagement pressure (PSLG) from the first solenoid valve (SLG) in accordance with the timing, and using the source pressure ($P_{LPM2}$) which is supplied at all times during operation of the drive source.

In the hydraulic control device (12, 112) for the automatic transmission (10) according to the first to fourth embodiments, in addition, the signal pressure supply section (21, SLP, SL3) is a manual valve (21) that supplies a reverse range pressure (PR) that is output when a travel range is a reverse range; and the signal pressure (PR, PSLP, PSL3, PD) is the reverse range pressure (PR). With the configuration, the presence or absence of the supply of the engagement pressure (PSLG) to the reverse engagement element (B1) can be switched by switching the switching valve (27) in accordance with whether or not the travel range is the reverse range. That is, determination whether or not the travel range is the reverse range can be caused to coincide, in timing, with switching of the presence or absence of the supply of the engagement pressure (PSLG) to the reverse engagement element (B1), which can simplify the circuit configuration of the hydraulic control device (12, 112).

The first embodiment provides the hydraulic control device (12) for the automatic transmission (10), including: a synchronization detection section (15) that detects that the synchronization mechanism (S1) is in the engaged state, a shift position detection section (14) that detects that the travel range is the reverse range, and a second solenoid valve (SLS) capable of supplying a resisting pressure (PSLS) that maintains the switching valve (27) in the non-reverse state against the signal pressure (PR, PSLP, PSL3, PD). The second solenoid valve (SLS) controls the resisting pressure (PSLS) so as to bring the switching valve (27) into the reverse state in the case where the synchronization detection section (15) detects that the synchronization mechanism (S1) is in the engaged state and the shift position detection section (14) detects that the travel range is the reverse range. With the configuration, since the synchronization mechanism (S1) is in the engaged state, the engagement pressure (PSLG) is supplied to the synchronization mechanism (S1). In such a state, the hydraulic pressure is not varied abruptly even if the switching valve (27) is switched from the non-reverse state to the reverse state to switch the hydraulic pressure to be supplied to the synchronization mechanism (S1) from the engagement pressure (PSLG) to the source pressure ($P_{LPM2}$), which allows the hydraulic pressure to be switched smoothly without incurring abrupt operation of the synchronization mechanism (S1).

The first embodiment provides the hydraulic control device (12) for the automatic transmission (10), including a synchronization detection section (15) that detects that the synchronization mechanism (S1) is in the engaged state, a shift position detection section (14) that detects that the travel range is the reverse range, and a second solenoid valve (SLS) capable of supplying a resisting pressure (PSLS) that maintains the switching valve (27) in the non-reverse state against the signal pressure (PR, PSLP, PSL3, PD). The second solenoid valve (SLS) controls the resisting pressure (PSLS) so as to bring the switching valve (27) into the non-reverse state in the case where the synchronization detection section (15) detects that the synchronization mechanism (S1) is not in the engaged state and the shift position detection section (14) detects that the travel range is the reverse range. With the configuration, it is possible to suppress switching of the hydraulic pressure to be supplied to the synchronization mechanism (S1) to the source pressure ($P_{LPM2}$), and to prevent abrupt operation of the synchronization mechanism (S1).

In the hydraulic control device (12) for the automatic transmission (10) according to the first embodiment, in addition, the continuously variable speed change mechanism (4) includes a primary pulley (41) that is supplied with a primary pulley pressure to adjust the speed ratio, and a secondary pulley (42) that is supplied with a secondary pulley pressure to regulate a holding pressure. The second solenoid valve (SLS) is a secondary linear solenoid valve (SLS) that regulates the secondary pulley pressure; and the resisting pressure (PSLS) is a secondary control pressure (PSLS) supplied from the secondary linear solenoid valve (SLS). With the configuration, the secondary control pressure (PSLS) which is supplied from the secondary linear solenoid valve (SLS) is used as the resisting pressure (PSLS). Thus, even if the secondary control pressure (PSLS) is varied during reverse travel, the holding pressure for the belt is merely varied, and the travel itself is not affected significantly. In addition, there is no need to provide a new solenoid valve, and thus an increase in number of components can be suppressed.

In the hydraulic control device (12) for the automatic transmission (10) according to the second embodiment, in addition, the continuously variable speed change mechanism (4) includes a primary pulley (41) that is supplied with a primary pulley pressure to adjust the speed ratio, and a secondary pulley (42) that is supplied with a secondary pulley pressure to regulate a holding pressure. The signal pressure supply section (21, SLP, SL3) is a primary linear solenoid valve (SLP) that regulates the primary pulley pressure; and the signal pressure (PR, PSLP, PSL3, PD) is a primary control pressure (PSLP) supplied from the primary linear solenoid valve (SLP). With the configuration, the primary control pressure (PSLP) can be regulated during reverse travel. Thus, there is no need for a resisting pressure (PSLS) for the switching valve (27), which can simplify the hydraulic circuit.

In the hydraulic control device (12) for the automatic transmission (10) according to the third embodiment, in addition, the signal pressure supply section (21, SLP, SL3) is an on-off solenoid valve (SLS) that generates the signal pressure (PSL3). With the configuration, the primary control pressure (PSLP) can be regulated during reverse travel. Thus, there is no need for a resisting pressure (PSLS) for the switching valve (27), which can simplify the hydraulic circuit. Moreover, a hydraulic pressure for controlling the continuously variable speed change mechanism (4) is not utilized. Thus, the signal pressure (PSL3) and the continuously variable speed change mechanism (4) can be controlled independently, which can simplify the hydraulic circuit and the control.

The second and third embodiments provide the hydraulic control device (12) for the automatic transmission (10), including: a synchronization detection section (15) that detects that the synchronization mechanism (S1) is in the engaged state, and a shift position detection section (14) that detects that a travel range is a reverse range. The signal pressure supply section (21, SLP, SL3) controls the signal pressure (PR, PSLP, PSL3, PD) so as to bring the switching valve (27) into the reverse state in the case where the synchronization detection section (15) detects that the synchronization mechanism (S1) is in the engaged state and the shift position detection section (14) detects that the travel range is the reverse range. With the configuration, since the synchronization mechanism (S1) is in the engaged state, the engagement pressure (PSLG) is supplied to the synchronization mechanism (S1). In such a state, the hydraulic pressure is not varied abruptly even if the switching valve (27) is switched from the non-reverse state to the reverse state to switch the hydraulic pressure to be supplied to the synchronization mechanism (S1) from the engagement pressure (PSLG) to the source pressure ($P_{LPM2}$), which allows the hydraulic pressure to be switched smoothly without incurring abrupt operation of the synchronization mechanism (S1).

The first to fourth embodiments provide the hydraulic control device (12, 112) for the automatic transmission (10), including: a synchronization detection section (15) that detects that the synchronization mechanism (S1) is in the engaged state, and a shift position detection section (14) that detects that a travel range is a reverse range. The signal pressure supply section (21, SLP, SL3) controls the signal pressure (PR, PSLP, PSL3, PD) so as to bring the switching valve (27) into the non-reverse state in the case where the synchronization detection section (15) detects that the synchronization mechanism (S1) is not in the engaged state and the shift position detection section (14) detects that the travel range is the reverse range. With the configuration, it is possible to suppress switching of the hydraulic pressure to be supplied to the synchronization mechanism (S1) to the source pressure ($P_{LPM2}$), and to prevent abrupt operation of the synchronization mechanism (S1).

In the hydraulic control device (112) for the automatic transmission (10) according to the fourth embodiment, in addition, the forward/reverse switching device (3) includes a forward engagement element (C1) that forms a path through which rotation in a forward direction of the vehicle (1) is transferred when the forward engagement element (C1) is engaged, and a reverse engagement element (B1) that forms a path through which rotation in a reverse direction, of the vehicle (1) is transferred when the reverse engagement element (B1) is engaged; and the engagement element (B1, C1, C2) is the forward engagement element (C1). With the configuration, the synchronization mechanism (S1) and the forward engagement element (C1) can be engaged concurrently even in the case where both the synchronization mechanism (S1) and the forward engagement element (C1) are engaged in the forward range, for example.

In the hydraulic control device (12, 112, 212) for the automatic transmission (10, 110) according to the first to fifth embodiments, in addition, the engagement element (C2) is provided in the second power transfer path (a2), and brought into an engaged state in the second mode to connect the input shaft (2) and the driving shaft (60) to each other through the second power transfer path (a2) for rotation transfer. With the configuration, the first solenoid valve (SLG) can be commonly used for the synchronization mechanism (S1) and the engagement element (C2) as the source of supply of the engagement pressure (PSLG).

INDUSTRIAL APPLICABILITY

The hydraulic control device for an automatic transmission relates to a hydraulic control device for an automatic transmission that includes a speed change mechanism mounted on a vehicle, for example, and is particularly suitable for use as a hydraulic control device for an automatic transmission that has a synchronization mechanism provided in at least a part of a power transfer path.

The invention claimed is:

1. A hydraulic control device for an automatic transmission that includes:
    an input shaft drivably coupled to a drive source of a vehicle;
    a driving shaft drivably coupled to wheels;
    a synchronization mechanism; and
    an engagement element provided at at least one location in a first power transfer path that couples the input shaft and the driving shaft to each other via the synchronization mechanism and a second power transfer path that couples the input shaft and the driving shaft to each other at least partially through a path that is different from the first power transfer path, wherein
    the automatic transmission is switchable between a first mode, in which the synchronization mechanism is brought into an engaged state to connect the input shaft and the driving shaft to each other through the first power transfer path for rotation transfer, and a second mode, in which the synchronization mechanism is brought into a disengaged state to connect the input shaft and the driving shaft to each other through the second power transfer path for rotation transfer, and
    an engagement pressure is supplied to and discharged from the synchronization mechanism and the engagement element, the hydraulic control device comprising:
    a first solenoid valve capable of supplying the engagement pressure, and
    a switching valve capable of supplying the engagement pressure, which is supplied from the first solenoid valve, switchably to one of the synchronization mechanism and the engagement element.

2. The hydraulic control device for the automatic transmission according to claim 1, comprising:
    a forward/reverse switching device that switches a rotational direction to change a travel direction of the vehicle; and
    a continuously variable speed change mechanism capable of continuously changing a speed ratio, wherein
    the first power transfer path couples the input shaft and the driving shaft to each other via the forward/reverse switching device, and
    the second power transfer path couples the input shaft and the driving shaft to each other via the continuously variable speed change mechanism.

3. The hydraulic control device for the automatic transmission according to claim 2, wherein
    the forward/reverse switching device includes a forward engagement element that forms a path through which rotation in a forward direction of the vehicle is transferred when the forward engagement element is engaged, and a reverse engagement element that forms a path through which rotation in a reverse direction of the vehicle is transferred when the reverse engagement element is engaged, and
    the engagement element is the reverse engagement element.

4. The hydraulic control device for the automatic transmission according to claim 3, wherein
    the synchronization mechanism includes an urging portion that maintains the synchronization mechanism in the engaged state when the engagement pressure is supplied, and that switches the synchronization mechanism to the disengaged state when the engagement pressure is not supplied.

5. The hydraulic control device for the automatic transmission according to claim 4, wherein
    a source pressure generator that generates a source pressure; and
    a signal pressure supplier capable of supplying a signal pressure, wherein
    the switching valve is switchable in accordance with the signal pressure, and is switchable to a non-reverse state, in which the engagement pressure which is supplied from the first solenoid valve is supplied to the synchronization mechanism and a hydraulic pressure in the reverse engagement element is drained, in the case where the signal pressure is not supplied, and to a reverse state, in which the engagement pressure which is supplied from the first solenoid valve is supplied to the reverse engagement element and the source pressure is supplied to the synchronization mechanism as the engagement pressure, in the case where the signal pressure is supplied.

6. The hydraulic control device for the automatic transmission according to claim 5, wherein
the signal pressure supplier is a manual valve that supplies a reverse range pressure that is output when a travel range is a reverse range, and
the signal pressure is the reverse range pressure.

7. The hydraulic control device for the automatic transmission according to claim 6, the automatic transmission including
a synchronization detection section that detects that the synchronization mechanism is in the engaged state; and
a shift position detection section that detects that the travel range is the reverse range; the hydraulic control device further comprising:
a second solenoid valve capable of supplying a resisting pressure that maintains the switching valve in the non-reverse state against the signal pressure, wherein
the second solenoid valve controls the resisting pressure so as to bring the switching valve into the reverse state in the case where the synchronization detection section detects that the synchronization mechanism is in the engaged state and the shift position detection section detects that the travel range is the reverse range.

8. The hydraulic control device for the automatic transmission according to claim 6, the automatic transmission including
a synchronization detection section that detects that the synchronization mechanism is in the engaged state; and
a shift position detection section that detects that the travel range is the reverse range; the hydraulic control device further comprising:
a second solenoid valve capable of supplying a resisting pressure that maintains the switching valve in the non-reverse state against the signal pressure, wherein
the second solenoid valve controls the resisting pressure so as to bring the switching valve into the non-reverse state in the case where the synchronization detection section detects that the synchronization mechanism is not in the engaged state and the shift position detection section detects that the travel range is the reverse range.

9. The hydraulic control device for the automatic transmission according to claim 8, wherein
the continuously variable speed change mechanism includes a primary pulley that is supplied with a primary pulley pressure to adjust the speed ratio, and a secondary pulley that is supplied with a secondary pulley pressure to regulate a holding pressure,
the second solenoid valve is a secondary linear solenoid valve that regulates the secondary pulley pressure, and
the resisting pressure is a secondary control pressure supplied from the secondary linear solenoid valve.

10. The hydraulic control device for the automatic transmission according to claim 5, wherein
the continuously variable speed change mechanism includes a primary pulley that is supplied with a primary pulley pressure to adjust the speed ratio, and a secondary pulley that is supplied with a secondary pulley pressure to regulate a holding pressure,
the signal pressure supplier is a primary linear solenoid valve that regulates the primary pulley pressure, and
the signal pressure is a primary control pressure supplied from the primary linear solenoid valve.

11. The hydraulic control device for the automatic transmission according to claim 5, wherein
the signal pressure supplier is an on-off solenoid valve that generates the signal pressure.

12. The hydraulic control device for the automatic transmission according to claim 11, comprising:
a synchronization detection section that detects that the synchronization mechanism is in the engaged state; and
a shift position detection section that detects that a travel range is a reverse range, wherein
the signal pressure supplier controls the signal pressure so as to bring the switching valve into the reverse state in the case where the synchronization detection section detects that the synchronization mechanism is in the engaged state and the shift position detection section detects that the travel range is the reverse range.

13. The hydraulic control device for the automatic transmission according to claim 11, comprising:
a synchronization detection section that detects that the synchronization mechanism is in the engaged state; and
a shift position detection section that detects that a travel range is a reverse range, wherein
the signal pressure supplier controls the signal pressure so as to bring the switching valve into the non-reverse state in the case where the synchronization detection section detects that the synchronization mechanism is not in the engaged state and the shift position detection section detects that the travel range is the reverse range.

14. The hydraulic control device for the automatic transmission according to claim 2, wherein
the forward/reverse switching device includes a forward engagement element that forms a path through which rotation in a forward direction of the vehicle is transferred when the forward engagement element is engaged, and a reverse engagement element that forms a path through which rotation in a reverse direction of the vehicle is transferred when the reverse engagement element is engaged, and
the engagement element is the forward engagement element.

15. The hydraulic control device for the automatic transmission according to claim 1, wherein
the engagement element is provided in the second power transfer path, and brought into an engaged state in the second mode to connect the input shaft and the driving shaft to each other through the second power transfer path for rotation transfer.

16. The hydraulic control device for the automatic transmission according to claim 3, wherein
a source pressure generator that generates a source pressure; and
a signal pressure supplier capable of supplying a signal pressure, wherein
the switching valve is switchable in accordance with the signal pressure, and is switchable to a non-reverse state, in which the engagement pressure which is supplied from the first solenoid valve is supplied to the synchronization mechanism and a hydraulic pressure in the reverse engagement element is drained, in the case where the signal pressure is not supplied, and to a reverse state, in which the engagement pressure which is supplied from the first solenoid valve is supplied to the reverse engagement element and the source pressure is supplied to the synchronization mechanism as the engagement pressure, in the case where the signal pressure is supplied.

17. The hydraulic control device for the automatic transmission according to claim 16, wherein the signal pressure supplier is a manual valve that supplies a reverse range pressure that is output when a travel range is a reverse range, and the signal pressure is the reverse range pressure.

18. The hydraulic control device for the automatic transmission according to claim 7, wherein the continuously variable speed change mechanism includes a primary pulley that is supplied with a primary pulley pressure to adjust the speed ratio, and a secondary pulley that is supplied with a secondary pulley pressure to regulate a holding pressure, the second solenoid valve is a secondary linear solenoid valve that regulates the secondary pulley pressure, and the resisting pressure is a secondary control pressure supplied from the secondary linear solenoid valve.

19. The hydraulic control device for the automatic transmission according to claim 16, wherein the continuously variable speed change mechanism includes a primary pulley that is supplied with a primary pulley pressure to adjust the speed ratio, and a secondary pulley that is supplied with a secondary pulley pressure to regulate a holding pressure, the signal pressure supply section is a primary linear solenoid valve that regulates the primary pulley pressure, and the signal pressure is a primary control pressure supplied from the primary linear solenoid valve.

20. The hydraulic control device for the automatic transmission according to claim 16, wherein the signal pressure supplier is an on-off solenoid valve that generates the signal pressure.

* * * * *